(12) United States Patent
Na

(10) Patent No.: US 9,762,681 B2
(45) Date of Patent: Sep. 12, 2017

(54) CLOUD COMPUTING-BASED DATA MANAGEMENT METHOD, AND SYSTEM AND APPARATUS FOR SAME

(71) Applicant: SK techx Co., Ltd., Seoul (KR)

(72) Inventor: Seung-Won Na, Seoul (KR)

(73) Assignee: SK techx Co., Ltd., Seoul (KR)

( * ) Notice: Subject to any disclaimer, the term of this patent is extended or adjusted under 35 U.S.C. 154(b) by 149 days.

(21) Appl. No.: 14/767,557

(22) PCT Filed: Dec. 26, 2013

(86) PCT No.: PCT/KR2013/012199
§ 371 (c)(1),
(2) Date: Aug. 12, 2015

(87) PCT Pub. No.: WO2014/126335
PCT Pub. Date: Aug. 21, 2014

(65) Prior Publication Data
US 2015/0381744 A1 Dec. 31, 2015

(30) Foreign Application Priority Data

Feb. 12, 2013 (KR) .......... 10-2013-0015001
Feb. 22, 2013 (KR) .......... 10-2013-0018947
Feb. 22, 2013 (KR) .......... 10-2013-0018948

(51) Int. Cl.
*G06F 13/00* (2006.01)
*H04L 29/08* (2006.01)
(Continued)

(52) U.S. Cl.
CPC ............ *H04L 67/16* (2013.01); *G06F 9/5072* (2013.01); *G06F 17/30997* (2013.01);
(Continued)

(58) Field of Classification Search
CPC ..... H04L 67/16; H04L 67/42; H04L 67/1097; H04L 67/306; H04L 65/60; G06F 9/5072; G06F 17/30997
(Continued)

(56) References Cited

U.S. PATENT DOCUMENTS 9,021,118 B2 * 4/2015 John .................. G06F 17/214
709/231
2006/0206533 A1 9/2006 MacLaurin et al.
(Continued)

FOREIGN PATENT DOCUMENTS

KR   1020060080946 A   7/2006
KR   1020060087006 A   8/2006
(Continued)

OTHER PUBLICATIONS

International Search Report for PCT/KR2013/012199 dated Mar. 26, 2014.

*Primary Examiner* — Kenneth R Coulter
(74) *Attorney, Agent, or Firm* — Hauptman Ham, LLP

(57) ABSTRACT

The present invention relates to a data management method based on cloud computing and a system and apparatus therefor. In particular, when a user uploads or downloads content to or from a metacloud-type storage server, data interoperability between terminals is performed using tag information associated with the metadata of the corresponding content, and thus the extraction of metadata is differently performed for each terminal, for each time, or for each user, so that a load between a terminal and a server can be minimized and a metacloud function can be smoothly provided. Furthermore, a metadata extraction target is controlled by a server, so that centralized requirements can be applied to the terminals at the same time and thus uniform service quality can be provided.

15 Claims, 12 Drawing Sheets

(51) Int. Cl.
  *G06F 17/30*  (2006.01)
  *G06F 9/50*  (2006.01)
  *H04L 29/06*  (2006.01)

(52) U.S. Cl.
  CPC .......... *H04L 65/60* (2013.01); *H04L 67/1097* (2013.01); *H04L 67/306* (2013.01); *H04L 67/42* (2013.01)

(58) Field of Classification Search
  USPC ........ 709/231, 232, 230, 223, 204–206, 245
  See application file for complete search history.

(56) References Cited

U.S. PATENT DOCUMENTS

| | | |
|---|---|---|
| 2008/0034064 A1 | 2/2008 | Choi et al. |
| 2010/0159883 A1 | 6/2010 | Pascal et al. |
| 2011/0153812 A1 | 6/2011 | Yoon et al. |
| 2011/0161409 A1 | 6/2011 | Nair et al. |
| 2012/0010995 A1 | 1/2012 | Skirpa et al. |
| 2012/0030368 A1* | 2/2012 | John .................... G06F 17/214 709/231 |
| 2014/0181633 A1* | 6/2014 | Mo .................. G06F 17/30893 715/234 |

FOREIGN PATENT DOCUMENTS

| | | |
|---|---|---|
| KR | 1020080011934 A | 2/2008 |
| KR | 1020100078536 A | 7/2010 |
| KR | 1020110073162 A | 6/2011 |
| KR | 1020120057027 A | 6/2012 |
| KR | 1020120115691 A | 10/2012 |

\* cited by examiner

CLOUD COMPUTING-BASED DATA MANAGEMENT METHOD, AND SYSTEM AND APPARATUS FOR SAME

CROSS REFERENCE TO RELATED APPLICATION

This application claims the priority of Korean Patent Application No. 10-2013-0015001 filed Feb. 12, 2013, No. 10-2013-0018947 filed Feb. 22, 2013 and No. 10-2013-0018948 filed Feb. 22, 2013 in the Korean Patent and Trademark Office. Further, this application is the National Phase application of International Application No. PCT/KR2013/012199 filed Dec. 26, 2013, which is incorporated herein by reference in its entirety.

TECHNICAL FIELD

The present invention relates to a data management method based on cloud computing and a system and apparatus therefor and, more particularly, to a data management method based on cloud computing and a system and apparatus therefor, which are capable of, when a user uploads or downloads content to or from a metacloud-type storage server, performing data interoperability between terminals using tag information associated with the metadata of the content, allowing the content to be shared between the terminals depending on whether identical content has been stored, checking the interests of the users based on content uploaded by the users, and automatically generating a community between users who have similar interests.

BACKGROUND ART

With the development of mobile communication networks and the advancement of terminal specifications, mobile communication terminals have become the essential belongings of people today beyond the level of conventional simple communication devices or information provision devices, and are evolving into total entertainment devices.

In particular, recently, cloud computing technologies that enable users to access a server connected to the Internet using various terminals anywhere and at any time and then use storage provided by the server or use various applications are widely used. Among these technologies, a cloud storage service (CSS) refers to a service that is capable of configuring physically separate pieces of storage equipment into a single piece of logical storage and allocating and providing a storage space on a capacity basis in real time when a user requests the storage space.

In this cloud storage service, storage spaces are allocated to authorized users, and the users use the cloud storage service by paying usage fees corresponding to the allocated storage spaces.

However, storage spaces used by users are limited spaces. Accordingly, efficient storage space control is required to allocate the storage spaces to numerous users and collect the storage spaces.

Accordingly, there are needs for not only the development of a technology capable of efficiently using storage spaces based on cloud computing and a technology capable of smoothly performing data interoperability between terminals but also the development of a technology capable of providing new additional services to users using the technologies.

DISCLOSURE

Technical Problem

As described above, the present invention is intended to solve a problem, such as a space limitation, that occurs because all the data of content uploaded by users is stored in a storage space when a storage service based on cloud streaming is provided to the users, and an object of the present invention is to provide a data management method based on cloud computing and a system and apparatus therefor, which are capable of classifying and extracting the metadata of content, uploaded by each terminal, on a per-terminal basis, designating tag information associated with the extracted metadata, and performing data interoperability between different terminals using the tag information.

Furthermore, an object of the present invention is to provide a data management method based on cloud computing and a system and apparatus therefor, which are capable of, when the upload of content is requested by a specific terminal, managing the content so that it is shared between terminals depending on whether identical content has been stored, and supporting a community between the terminals in which the shared content has been stored.

Furthermore, an object of the present invention is to provide a community generation method based on cloud computing and an apparatus and system therefor, wherein a metacloud-type storage server can check the interests of users based on content uploaded by the users and automatically generate a community between users who have similar interests.

Technical Solution

In order to accomplish the above objects, in accordance with an embodiment of the present invention, there is provided a service apparatus, including: a service communication unit configured to send and receive data used for content sharing by communicating with at least one terminal; and a service control unit configured to perform control so that a request for the upload of specific content is received from the at least one terminal, the metadata of the content is classified and extracted on a per-terminal basis in response to the request, tag information associated with the extracted metadata is designated, and data interoperability between different terminals is performed using the tag information. In this case, the tag information may be the associated information of the metadata extracted in association with the content, and the service control unit may extract the metadata using a partial meta-invocation control method.

In this case, the service control unit may perform control so that whether content identical to the content has been stored is checked in response to the request, management is performed to enable the content to be shared between terminals if content identical to the content has been stored, and a community service between terminals in which the shared content has been stored is supported.

In this case, the service control unit may include: a metadata management unit configured to extract the metadata of the content, and to designate the tag information based on the metadata; and a community management unit configured to analyze the interest of the user of the terminal using the tag information designated in association with the content via the metadata management unit, and to support the generation of a community with another user who has an interest similar to that of the user of the terminal.

In this case, the service control unit may first extract metadata, which has been greatly changed, using at least one metadata invocation method in which the service apparatus considers a usage history and a data distribution processing situation.

In this case, the metadata may include one or more of: any one of information about the time at which the content was first created, information about an author who created the content, source information, information about the absolute path, object size and object type folder of the content, an audio codec, a video codec, format information, resolution, a sample rate and a file format related to the playback of the content; any one of recent access time information, usage frequency information and recent modification time information before the upload of the content, recent access time information, usage frequency information and recent modification time information after the upload of the content, recent access time information and recent modification time information after the upload of the content, and any one of pieces of information about the genre, title, player and singer of the content designated by the user of the terminal; and any one of pieces of information about gender, an age group, hobbies and a place of residence related to the personal information of the user of the terminal.

In this case, the community management unit may search for another user, who has an interest similar to that of the user of the terminal, among users designated as agreeing with the generation of the community, and may support the generation of the community between the user of the terminal and the other user.

In this case, the community management unit may send a message intended for the generation of the community to the user of the terminal and the other user.

In accordance with an embodiment of the present invention, there is provided a data management system based on cloud computing, including: at least one terminal configured to request the upload or download of at least one piece of content in response to a request from a user, and to perform data interoperability with another terminal; and a service apparatus configured to perform control so that a request for the upload of specific content is received from the at least one terminal, the metadata of the content is classified and extracted on a per-terminal basis in response to the request, tag information associated with the extracted metadata is designated, and data interoperability between different terminals is performed using the tag information. In this case, the tag information may be the associated information of the metadata extracted in association with the content, and the service apparatus may extract the metadata using a partial meta-invocation control method.

In accordance with an embodiment of the present invention, there is provided a data management method based on cloud computing, including: receiving, by a service apparatus, a request for the upload of specific content from at least one terminal; classifying and extracting, by the service apparatus, the metadata of the content on a per-terminal basis using a partial meta-invocation control method in response to the request; designating, by the service apparatus, tag information associated with the extracted metadata; and performing, by the service apparatus, data interoperability between different terminals using the tag information. In this case, the tag information may be associated the information of the metadata extracted in association with the content.

In this case, the data management method may further include: checking, by the service apparatus, whether content identical to the content has been stored in response to the request; performing, by the service apparatus, management so that the content is shared between terminals if content identical to the content has been stored; and supporting, by the service apparatus, a community between terminals in which the shared content has been stored.

In this case, the data management method may further include: analyzing, by the service apparatus, the interest of the user of the terminal using the tag information designated in association with the content; and supporting, by the service apparatus, the generation of a community with another user who has an interest similar to that of the user of the terminal.

In this case, classifying and extracting the metadata on the per-terminal basis may include first extracting metadata, which has been greatly changed, using at least one metadata invocation method in which the service apparatus considers a usage history and a data distribution processing situation.

In this case, the data management method may further include receiving, by the service apparatus, terminal information from the terminal.

In this case, classifying and extracting the metadata on the per-terminal basis may include checking, by the service apparatus, the attribute information of the content that is included in the content and the user information of the content, and extracting the metadata using the attribute information, the user information, and the terminal information.

In this case, checking the attribute information and the user information may include combining, by the service apparatus, information about at least one of a file format, a playback time, resolution, a compression method, an encoding type, a file name, a file size, and picture quality in order to check the attributes of the content, and checking whether the content identical to the content has been stored by performing comparison.

In this case, performing the management may include providing, by the service apparatus, the terminal information and user information of another terminal in which the content has been stored.

In this case, the data management method may further include extracting, by the service apparatus, attribute information included in the content and metadata associated with usage information of the content if content identical to the content has not been stored; classifying and managing, by the service apparatus, the extracted metadata on a per-terminal basis; and storing, by the service apparatus, the executable data of the content.

In this case, supporting the community may include providing, by the service apparatus, at least one community of a social network service (SNS) and an instant messenger (IM) between the terminals in which the identical content has been stored.

In accordance with an embodiment of the present invention, there is provided a data management method based on cloud computing, including: requesting, by a terminal, the upload of at least one piece of content from a service apparatus; if another terminal in which the content has been stored is present, receiving, by the terminal, the terminal information and user information of the other terminal in which content, whose tag information associated with the content has been checked and which has been identified based on metadata associated with the tag information, has been previously stored; and checking, by the terminal, the received terminal information and user information, and performing, by the terminal, data sharing. In this case, the metadata may be extracted by the service apparatus using a partial meta-invocation control method.

As another means for solving the above objects, there is provided a computer-readable storage medium having stored thereon a program configured to perform a data management method based on cloud.

Advantageous Effects

In accordance with the present invention, the extraction of metadata is differently performed for each terminal, for each time, or for each user, so that a load between a terminal and a server can be minimized and a metacloud function can be smoothly provided.

Furthermore, a metadata extraction target is controlled by a server, so that centralized requirements can be applied to the terminals at the same time and thus uniform service quality can be provided.

Furthermore, metadata is extracted from content uploaded by each user and tag information associated with the metadata is stored and managed on a per-terminal basis, so that redundant content storage can be prevented and the storage space of a server can be used more efficiently.

Furthermore, the data sharing of the identical content can be performed, so that an upload load can be minimized when users make upload requests. Accordingly, network traffic can be reduced, and a storage space can be reduced thanks to the removal of redundant data.

Furthermore, the present invention can be extended to a new business model for a community service, such as a social network service (SNS) or an instant messenger (IM) between users based on content sharing.

Furthermore, metadata is extracted from content uploaded by each user and is then stored and managed on a per-terminal basis, so that redundant content storage can be prevented and the storage space of a server can be used more efficiently.

Moreover, the interests of users are determined based on content uploaded by the users, users who have similar interests are recommended, and a community between the users is automatically generated, so that a user can be provided with a new additional service and new business can be created.

MODE FOR INVENTION

Figure 1:
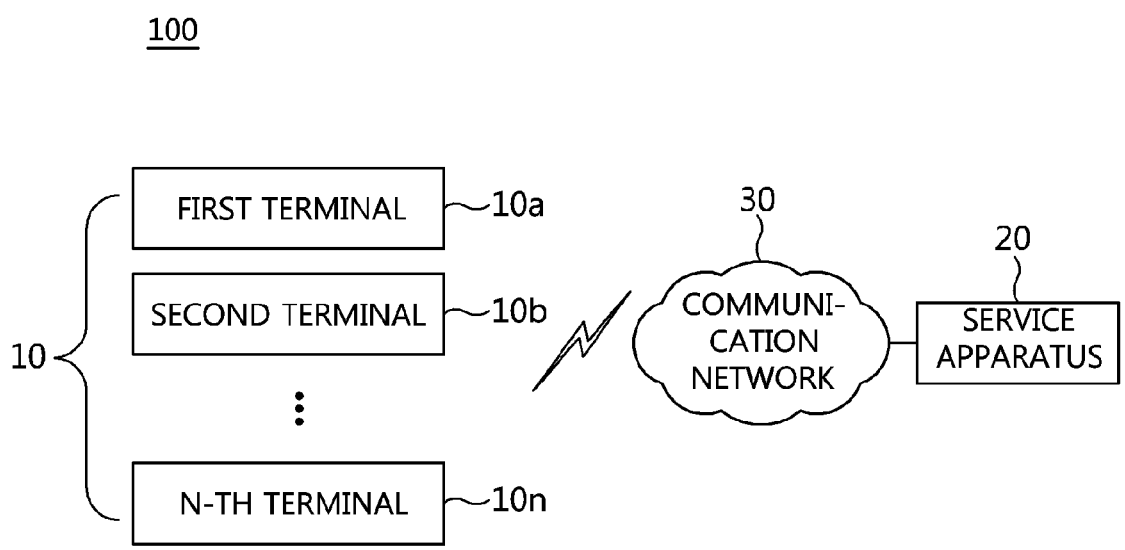
FIG. 1 is a diagram showing the configuration of a data management system based on cloud computing according to an embodiment of the present invention.

Preferred embodiments of the present invention will be described in detail below with reference to the accompanying drawings. Redundant descriptions and descriptions of well-known functions and configurations that have been deemed to make the gist of the present invention unnecessarily obscure will be omitted below. Furthermore, it should be noted that the same reference numerals are used to designate the same components throughout the drawings as much as possible.

The terms and words used in the following specification and the attached claims should not be restrictively interpreted as having common and dictionary meanings, but should be interpreted as having meanings and concepts in conformity with the technical spirit of the present invention based on the principle that an inventor can appropriately define the concepts of terms in order to describe his or her invention in the best way. Accordingly, since the embodiments described in the present specification and the configurations shown in the drawings merely correspond to the preferred embodiments of the present invention and do not cover all the technical spirit of the present invention, it should be appreciated that there may be various equivalents and modifications that may replace the configurations at the time at which the present application is filed. Furthermore, the terms "first," "second" and so on are used to describe various components, and are intended to distinguish one component from other components but are not intended to limit these components.

In the following description, although a terminal according to an embodiment of the present invention is described by using a mobile communication terminal capable of connecting to a communication network and uploading or downloading content based on a cloud computing system as a representative example, the terminal is not limited to the mobile communication terminal, but may be applied to various terminals, such as all information communication devices, multimedia terminals, wired terminals, fixed-type terminals, and Internet Protocol (IP) terminals. Furthermore, the terminal may be advantageously used when it is one of mobile terminals having various mobile communication specifications, such as a handheld phone, a portable multimedia player (PMP), a mobile Internet device (MID), a smart phone, a desktop, a tablet PC, a notebook, a net book, an information communication device, etc.

A data management system based on cloud computing according to an embodiment of the present invention is described below. In the following description, content sharing may be based on a concept including content transmission. Furthermore, data management may be based on a concept including data transmission.

FIG. 1 is a diagram showing the configuration of a data management system based on cloud computing according to an embodiment of the present invention.

Referring to FIG. 1, the data management system 100 based on cloud computing according to an embodiment of the present invention includes a plurality of terminals 10a, 10b, . . . , 10n (10), a service apparatus 20, and a communication network 30.

The communication network 30 performs a series of data transmission and reception operations required for data transmission and an information exchange between the terminals 10 and the service apparatus 20. In particular, various types of communication networks may be used as the communication network 30. For example, wireless communication methods, such as wireless LAN (WLAN), Wi-Fi, Wibro, Wimax and High-Speed Downlink Packet Access (HSDPA) methods, or wired communication methods, such as Ethernet, xDSL (ADSL, VDSL), Hybrid Fiber Coax (HFC), Fiber To The Curb (FTTC) and Fiber To The Home (FTTH) methods, may be used for the communication network 30. Meanwhile, the communication network 30 is not limited to the communication methods presented above, and may include all types of communication methods that have been widely known or that will be developed in the future, as well as the aforementioned communication methods.

The plurality of terminals 10 are devices capable of sending and receiving various types of information to and from the service apparatus 20 over the communication network 30, and refer to devices of users capable of sending and receiving various types of information over the communication network 30 in response to manipulations of the users.

For convenience of description, two user terminals, i.e., the first terminal 10a and the second terminal 10b, have been shown as being connected to the service apparatus 20 over the communication network 30 as an example. However, in actual implementations, a large number of terminals 10 may be connected to the service apparatus 20. Furthermore, the terminal 10 may perform voice or data communication over the communication network 30. For this purpose, the terminal 10 of the present invention may include a browser configured to send and receive information, memory configured to store programs and protocols, a microprocessor configured to perform operation and control by executing various programs.

In particular, the terminal 10 according to an embodiment of the present invention connects to the service apparatus 20 over the communication network 30, and performs a function of data transmission based on cloud computing. In this case, the terminal 10 may store a plurality of pieces of content, and may execute or use content. In this case, the content may be a moving image such as a movie, a still image such as a photo, a source sound file such as a music, and content such as a document, and may be an application installed on the terminal 10. In addition, any type of content that may be stored in the terminal 10 and executed in the terminal 10 may be applied as the content of the present invention.

The terminal 10 may upload content stored therein to a specific storage space provided by the service apparatus 20 in response to a request from a user, or may download content uploaded to the service apparatus 20 in response to a request from a user. In this case, the content stored in the terminal 10 may be deleted as soon as it is uploaded to the service apparatus 20. Furthermore, the terminal 10 also uploads content usage information, i.e., a content usage history based on the execution of the content, as well as content information, i.e., executable data required for the execution of the content.

Furthermore, when content identical to content to be stored in the terminal 10 has been stored in the service apparatus 20, the terminal 10 may not store the executable data of the corresponding content, but may receive the terminal information of the terminal, which has stored the corresponding content, and user information from the service apparatus 20. Thereafter, the user of the terminal 10 may execute a community service, such as a social network service or an instant messenger, in conjunction with the user of another terminal in which the identical content has been stored, and the users may share data.

The terminal 10 requests the upload of at least one piece of content from the service apparatus 20. In this case, the terminal 10 checks whether the identical content has been stored. If the identical content has been stored, the terminal 10 receives terminal information and the user information of a terminal in which the identical content has been previously stored. Thereafter, the terminal 10 checks the received terminal information and user information, and performs data sharing. Meanwhile, if the content identical to the content whose upload has been requested has not been stored, the terminal 10 may send the executable data of the content to the service apparatus 20 so that the content can be managed by the service apparatus 20.

In order to perform the operation, the user of the terminal 10 may preferably have previously subscribed to a service provided by the service apparatus 20. In order to subscribe to the service, the user may access a service page provided by the service apparatus 20 using the terminal 10 or a separate device, and then may perform service subscription. Furthermore, the service subscription may be performed via a service application. The service application may be downloaded via an application store and then installed on the terminal 10. When the terminal 10 is a feature phone, the service application may be an application that is run on a downloaded virtual machine (VM). Furthermore, the service may be used in the form of a cloud service even when a service application installed on the terminal 10 is not used depending on the form of service provided by the service apparatus 20.

Once the subscription to the service provided by the service apparatus 20 has been completed via the process, the terminal 10 may receive terminal information from a user when executing the service application or when accessing the service apparatus 20 via various paths, and may perform user authentication via the service apparatus 20. In this case, the terminal information is information required for user authentication, and may be a member ID and a password designated by the user or may be terminal identification information, such as an electronic serial number (ESN) or a mobile identification number (MIN). In addition, the terminal information may include information corresponding to the type of terminal or supportable specifications.

The terminal 10 provides terminal information to the service apparatus 20 when accessing the service apparatus 20, and thus may be allocated a storage space by the service apparatus 20. In this case, the allocated storage space may vary depending on the terminal information. In other words, as described above, in the state in which the terminal 10 has previously subscribed to a service provided by the service apparatus 20, the terminal may be allocated a storage space when subscribing to the service. In this case, a service fee may vary depending on the allocated space. Thereafter, when the terminal 10 accesses the service apparatus 20, the terminal 10 provides terminal information to the service apparatus 20, and performs user authentication. The service apparatus 20 checks the allocated storage space based on the terminal information of the terminal 10, and provides the allocated storage space.

The service apparatus 20 is an apparatus configured to support the generation of a community based on cloud computing. Once it is determined that the access of a specific terminal 10 has been made, the service apparatus 20 checks terminal information provided by the terminal 10, and also checks whether the terminal 10 has subscribed to a service. Thereafter, if the terminal 10 has normally subscribed to the service, the service apparatus 20 checks whether there is a storage space previously allocated to the terminal 10. If a previously allocated storage space is not present, the service apparatus 20 provides an allocated storage space based on the service subscription information of the terminal 10.

In particular, the service apparatus 20 according to an embodiment of the present invention receives a request for the upload of specific content from at least one terminal 10, and classifies and extracts the metadata of the content on a per-terminal basis in conformity with the request. Furthermore, the service apparatus 20 designates tag information associated with the extracted metadata, and performs data interoperability between different terminals using the tag information.

When the download of specific content is requested by a single terminal 10, the service apparatus 20 checks tag information associated with the content in response to the request. Furthermore, the service apparatus 20 identifies a terminal in which the executable data of the corresponding content has been stored based on metadata associated with the tag information. Thereafter, the service apparatus 20 may request the identified terminal to send the executable data of the content.

In particular, the service apparatus 20 according to an embodiment of the present invention receives a signal requesting the upload of specific content from at least one terminal. Furthermore, the service apparatus 20 checks whether the content identical to the specific content has been stored in response to the signal requesting the upload. In this case, in order to check the attributes of the content, the service apparatus 20 combines pieces of information, such as a file format, a playback time, resolution, a compression method, an encoding type, a file name, a file size and picture quality, performs comparison, and determines whether content identical to the specific content has been stored.

If content identical to the specific content has been stored, the service apparatus 20 performs management so that the specific content is shared between terminals. Accordingly, the service apparatus 20 supports a community between terminals in which shared content has been stored.

Meanwhile, if content identical to the content whose upload has been requested has not been stored, the service apparatus 20 extracts metadata associated with attribute information included in the content and the usage information of the content, and classifies and manages the extracted metadata on a per-terminal basis. Thereafter, the service apparatus 20 stores the executable data of the content.

In particular, when the upload of content is requested by the terminal 10 that has subscribed to a service, the service apparatus 20 according to an embodiment of the present invention extracts metadata from the content, and designates tag information associated with the content using the metadata. In this case, when uploading the content to the service apparatus 20, the terminal 10 includes executable data required for the execution of the content, content information including the attribute information of the content, and content usage information, i.e., information based on a content usage history, in the content. The service apparatus 20 extracts the metadata of the content using the content information, the content usage information, and terminal information.

In this case, the metadata of the content may include information about an author who has first created the content and information about the user of the terminal 10 who has used the content as the attribute information of the content, other than the executable data required for the execution of the content. For example, the metadata according to an embodiment of the present invention may include: any one of a recent access time, a recent modification time, usage frequency information the first creation time, author information and user information in the terminal 10 before the content is updated to the service apparatus 20, a recent access time and a recent modification time after the content has been uploaded to the service apparatus 20, an absolute path other than a root folder, an object size and an object type folder, and an audio codec, a video codec, format information, resolution, a sample rate and a file format related to the content; and any one of other pieces of information, such as information about the genre, title, player and singer of the content designated by the user of the terminal.

Thereafter, the service apparatus 20 designates tag information associated with the content using the metadata. In this case, the tag information is the associated information of the metadata. For example, when the content is a music video of a specific singer and the singer is a singer who has a sexy image, the tag information associated with the content may be designated as being sexy, an S star, or a sexy dance. Furthermore, if the content is content frequently executed by the user of the terminal 10, the tag information associated with the content may be designated as a favorite or my favorite.

As described above, after the metadata of the content has been extracted in association with the content uploaded by the terminal 10 and the tag information associated with the content is designated based on the metadata, the service apparatus 20 analyzes the interest of the user of the terminal 10 using the tag information. For example, the service apparatus 20 may determine that the user of the first terminal 10a has a great interest in a sexy singer based on the content uploaded by the user of the first terminal 10a. Thereafter, the service apparatus 20 supports the generation of a community performed in conjunction with another user having an interest similar to that of the user of the first terminal 10a. In other words, since the service apparatus 20 has determined that the user of the first terminal 10a has a great interest in a sexy singer, the service apparatus 20 may check the terminal of another user who has a great interest in a sexy singer, for example, the user of the second terminal 10b, may provide the first terminal 10a with recommendation information about the user of the second terminal 10b, and may also support the generation of a community between the user of the first terminal 10a and the user of the second terminal 10b.

Furthermore, the service apparatus 20 according to an embodiment of the present invention separately manages executable data required for the execution of content, and the content information of the content, metadata extracted based on content usage information and tag information. That is, the service apparatus 20 manages executable data required for the execution of content and metadata in a separate, independent manner. Accordingly, the service apparatus 20 may use storage space more efficiently because it redundantly generates only metadata when the redundant content of a plurality of users is uploaded and manages executable data required for actual execution without redundancy.

Furthermore, the service apparatus 20 of the present invention may perform a billing process based on the provision of a storage space to the terminal 10.

Furthermore, a processor mounted on the terminal 10 or the service apparatus 20 according to the present invention may process program instructions required for the performance of a method according to the present invention. In one implementation, the processor may be a single-threaded processor. In another implementation, the processor may be a multi-threaded processor. Furthermore, the processor may process instructions stored in memory or a storage device.

Accordingly, the present invention may differently extract metadata for each terminal, for each time, or for each user, thereby minimizing the load between a terminal and a server and smoothly providing a metacloud function. Furthermore, a metadata extraction target is controlled by a server, thus the incorporation of centralized requirements is simultaneously applied to all the terminals, thereby providing constant service quality. Furthermore, since metadata is extracted from content uploaded by a user and then tag information associated with the metadata is stored and managed on a per-terminal basis, redundant content storage may be prevented and the storage space of the server may be used more efficiently. Furthermore, in the present invention, an upload load may be minimized when a user requests upload because data sharing is possible with respect to the identical content. Accordingly, network traffic may be reduced, and a storage space may be reduced by the removal of redundant data. Furthermore, the present invention can be expanded to a new business model for a community service, such as a social network service or an instant messenger, between users based on content sharing. Furthermore, metadata is extracted from content uploaded by a user and is then stored and managed on a per-terminal basis, thereby preventing redundant content storage and using the storage space of a server more efficiently.

In accordance with an embodiment of the present invention, when a plurality of terminals deletes specific content in response to a request from a specific terminal while sharing the specific content via the service apparatus 20, executable data, i.e., the physical data of the corresponding content, may be stored in the service apparatus 20 and continue to be managed, and only a sharing relationship between the terminals may not be provided.

The principal components and operation method of the terminal 10 according to an embodiment of the present invention are described below.

Figure 2:
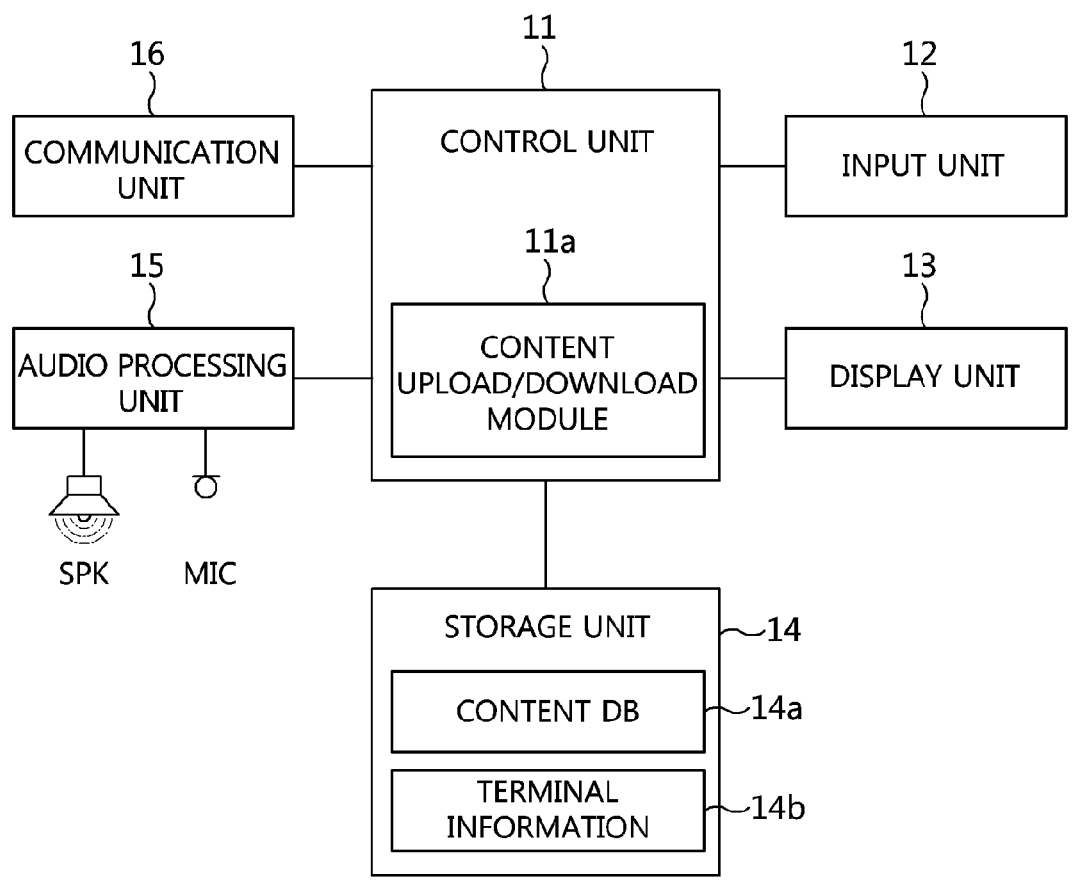
FIG. 2 is a block diagram showing the configuration of a terminal according to the present invention.

FIG. 2 is a block diagram showing the configuration of the terminal according to the present invention.

Referring to FIG. 2, the terminal 10 according to the present invention includes a control unit 11, an input unit 12, a display unit 13, a storage unit 14, an audio processing unit 15, and a communication unit 16. In this case, the control unit 11 includes a content upload/download module 11a, and the storage unit 14 includes a content DB 14a and terminal information 14b.

The input unit 12 receives various types of information, such as numerical and alphabetical information, and transfers input signals related to the setting of various functions and the control of the functions of the terminal 10 to the control unit 11. Furthermore, the input unit 12 may be configured to include at least one of a keypad and a touch pad, which generates an input signal in response to the touching or manipulation of a user. In this case, the input unit 12 is configured in the form of a single touch panel (or a touch screen) along with the display unit 13, and may perform input and display functions at the same time. Furthermore, all types of input means to be developed in the future as well as input devices, such as a keyboard, a keypad, a mouse, and a joystick, may be used as the input unit 12. In particular, the input unit 12 according to the present invention transfers an input signal, adapted to upload or download content to or from the service apparatus 20 based on cloud computing, to the control unit 11.

The display unit 13 displays information about a series of operating states and operation results generated while the function of the terminal 10 is being performed. Furthermore, the display unit 13 may display the menus of the terminal 10 and user data input by a user. In this case, the display unit 13 may include a liquid crystal display (LCD), a thin film transistor LCD (TFT-LCD), a light-emitting diode (LED), an organic LED (OLED), an active matrix OLED (AMO-LED), a retina display, a flexible display, and a three-dimensional display. In this case, when the display unit 13 is configured in the form of a touch screen, the display unit 13 may perform some or all of the functions of the input unit 12. In particular, the display unit 13 according to the present invention displays information related to the execution of content provided based on cloud computing on a screen.

The storage unit 14 is a device for storing data, includes a main storage device and an auxiliary storage device, and stores application programs required for the performance of the functions of the terminal 10. The storage unit 14 may basically include a program region and a data region. In this case, when each function is activated in response to a request from a user, the terminal 10 provides the function by executing a corresponding application program under the control of the control unit 11. In particular, the storage unit 14 according to the present invention stores an operating system adapted to boot up the terminal 10, a program adapted to upload or download content to or from the service apparatus 20 based on cloud computing, etc. Furthermore, the storage unit 14 stores the content DB 14a configured to store a plurality of pieces of content and the terminal information 14b. In this case, the content DB 14a includes executable data required for the execution of content and the attribute information of content, and stores a content usage history based on the execution of content. Furthermore, the terminal information 14b may include information about the specifications of the terminal.

The audio processing unit 15 performs a function of transferring an audio signal, received from a speaker SPK or microphone MIC used to output an audio signal by playing back the audio signal, to the control unit 11. The audio processing unit 15 may convert an audio signal in an analog form, received via the microphone, into a digital form, and then may transfer the converted signal to the control unit 11. Furthermore, the audio processing unit 15 may convert an audio signal in a digital form, output by the control unit 11, into an analog signal, and then may output the analog signal via the speaker. In particular, the audio processing unit 15 according to the present invention outputs a sound effect or an execution sound based on the execution of content.

The communication unit 16 performs a function of sending and receiving data to and from the service apparatus 20 over the communication network 30. In this case, the communication unit 16 includes an RF transmission means configured to perform up-conversion and amplification on the frequency of a transmitted signal, and an RF reception means configured to perform low-noise amplification on a received signal and perform down-conversion on a frequency. The communication unit 16 may include at least one of a wireless communication module (not shown) and a wired communication module (not shown). Furthermore, the wireless communication module is a component configured to send and receive data in accordance with a wireless communication method. When the terminal 10 uses wireless communication, the terminal 10 may send and receive data to and from the service apparatus 20 using any one of a wireless network communication module, a WLAN communication module, and a WPAN communication module. Furthermore, the wired communication module is configured to send and receive data in a wired manner. The wired communication module may access the communication network 30 through a line, and may send and receive data to and from the service apparatus 20. That is, the terminal 10 may access the communication network 30 using the wireless communication module or the wired communication module, and may send and receive data to and from the service apparatus 20 over the communication network 30. In particular, the communication unit 16 according to the present invention sends and receives data required to upload or download content based on cloud computing through communication with the service apparatus 20 or another terminal.

The control unit 11 may be a process device configured to operate an operation system (OS) and each of the components. For example, the control unit 11 may control the overall process of accessing the service apparatus 20. For example, when the terminal accesses the service apparatus 20 via a separate service application, the control unit 11 may control the overall process of executing the service application in response to a request from a user, and may perform control so that a service usage request is transmitted to the service apparatus 20 simultaneously with the execution of the service application. In this case, the control unit 11 may perform control so that terminal information required for user authentication is also transmitted.

The control unit 11 may execute specific content stored in the storage unit 14 in response to a request from a user. In this case, the control unit 11 may store a content usage history based on the execution of the content as content usage information.

The control unit 11 may upload executable data required for the execution of content, content information including the attribute information of the content, and content usage information, i.e., information based on a content usage history, to the service apparatus 20 by sending the executable data, the content information and the content usage information together.

Thereafter, the control unit 11 may delete content, transmitted and uploaded to the service apparatus 20, from the storage unit 14 in response to a request from a user, may access the service apparatus 20, and may execute and use content via the service apparatus 20.

Furthermore, after accessing the service apparatus 20 and downloading content from another terminal, the control unit 11 may perform control so that the content is stored in the storage unit 14. When content is executed via the service apparatus 20, the control unit 11 may receive only data required for the execution, and then may perform control so that the content is executed.

The control unit 11 performs a community service, such as a social network service or an instant messenger, in conjunction with another terminal that has stored the identical content in the service apparatus 20.

That is, the control unit 11 requests the upload of at least one piece of content from the service apparatus 20. In this case, the control unit 11 checks whether the identical content has been stored in the terminal. If the identical content has been stored, the control unit 11 receives the terminal information and user information of the terminal in which the identical content has been previously stored. Thereafter, the control unit 11 checks the received terminal information and user information, and performs data sharing. Meanwhile, if the content identical to the content whose upload has been requested has not been stored, the control unit 11 may send the executable data of the content to the service apparatus 20 so that the content can be managed.

In order to perform the functions of the terminal 10 more effectively, the control unit 11 may be configured to include the content upload/download module 11a. In particular, the content upload/download module 11a according to the present invention may perform a function of uploading or downloading content to or from the service apparatus 20 in response to a request from a user.

Figure 3:
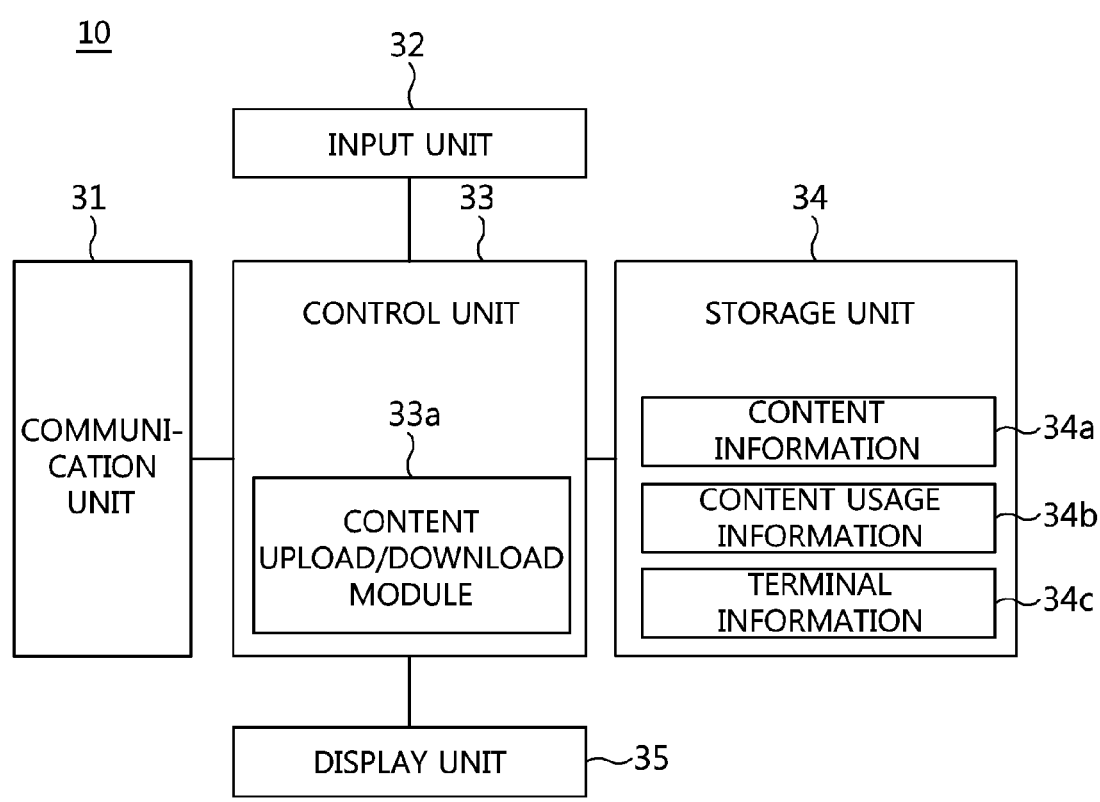
FIG. 3 is a block diagram showing the configuration of a terminal according to another embodiment of the present invention.

FIG. 3 is a block diagram showing the configuration of a terminal according to another embodiment of the present invention.

Referring to FIGS. 1 and 3, the terminal 10 according to an embodiment of the present invention may include a communication unit 31, an input unit 32, a control unit 33, a storage unit 34, and a display unit 35.

Each of the components is now described in greater detail. The communication unit 31 functions to support the transmission and reception of various types of information related to the service apparatus 20 over the communication network 30. For example, the communication unit 31 may upload content by sending the content to the service apparatus 20, or may receive uploaded content from the service apparatus 20. Furthermore, the communication unit 31 may send terminal information required for user authentication to the service apparatus 20, or may receive various types of other related information from the service apparatus 20.

The communication unit 31 may send and receive data using various communication methods as well as a wired method and a wireless method. The communication unit 31 may include a plurality of communication modules that sends and receives data in accordance with different communication methods.

The input unit 32 transfers various types of information, such as numerical and alphabetical information received from a user, and input signals related to the setting of various functions and the control of the functions of the terminal 10 to the control unit 33. In particular, the input unit 32 of the present invention supports various types of user input used for accessing the service apparatus 20, and supports various types of user input related to a community generation method based on cloud computing to the service apparatus 20.

The input unit 32 may include a key entry means such as a keyboard or a keypad, a touch input means such as a touch sensor or a touch pad, a voice input means, and a gesture input means including one or more of a gyro sensor, a terrestrial magnetism sensor, an accelerator sensor, a proximity sensor and a camera, as described above. In addition, the input unit 32 may include all types of input means that are being developed or that will be developed in the future.

The control unit 33 performs the overall control of the terminal 10. For example, the control unit 33 controls the supply of power to the components constituting the terminal 10 and the flows of signals adapted to perform functions. In this case, the control unit 33 may be an operation system (OS) and a process device configured to operate each of the components, for example, a central processing unit (CPU).

In particular, the control unit 33 according to an embodiment of the present invention may control the overall process of accessing the service apparatus 20. For example, when the service apparatus 20 is accessed via a separate service application, the control unit 33 may control the overall process of executing the service application in response to a request from a user, and may perform control so that a service usage request is transmitted to the service apparatus 20 simultaneously with the execution. In this case, the control unit 33 may perform control so that terminal information 34c required for user authentication is also transmitted.

Furthermore, the control unit 33 may execute specific content stored in the storage unit 34 in response to a request from a user. In this case, the control unit 33 may perform control so that a content usage history based on the execution of the content is stored as content usage information. Furthermore, once the access to the service apparatus 20 has been completed, the control unit 33 of the present invention may perform control so that content stored in the storage unit 34 is transmitted to the service apparatus 20 via the communication unit 31 in response to a request from a user.

In this case, the control unit 33 may upload executable data, i.e., source data required for the execution of the content, content information including the attribute information of the content, and content usage information, i.e., information based on the content usage history, by sending the executable data, the content information, and the content usage information to the service apparatus 20.

Thereafter, the control unit 33 may delete the content, uploaded by sending the content to the service apparatus 20, from the storage unit 34 in response to a request from a user, may access the service apparatus 20, and may execute and use the content via the service apparatus 20.

Furthermore, in response to a request from a user, the control unit 33 may perform control so that content stored in the service apparatus 20 is received, downloaded, and stored in the storage unit 34. When the content is executed via the service apparatus 20, the control unit 33 may perform control so that the content is executed after only data required for the execution has been received.

In order to perform the functions of the terminal 10 more effectively, the control unit 33 may be configured to include a content upload/download module 33a. In this case, the content upload/download module 33a may perform a function of uploading or downloading content to or from the service apparatus 20 in response to a request from a user.

The storage unit 34 may temporarily store various data, generated while application programs are being executed, as well as application programs adapted to perform functions according to an embodiment of the present invention. In particular, the storage unit 34 of the present invention may store content received via a separate device. In this case, the storage unit 34 stores executable data required for the execution of content and content information 34a including the attribute information of the content, and also stores content usage information 34b, i.e., a content usage history based on the execution of the content under the control of the control unit 33. Furthermore, the storage unit 34 may store the terminal information 34c required for user authentication, such as user information and terminal identification information, along with the content information 34a and the content usage information 34b. In this case, the terminal information 34c may further include terminal specification information.

Furthermore, after content has been uploaded to the service apparatus 20, the storage unit 34 of the present invention may access the service apparatus 20, and temporarily store various types of information generated while the content is being executed based on cloud computing. In this case, the various types of information may be deleted when the access to the service apparatus 20 is terminated.

The storage unit 34 may basically include a program region and a data region. The program region stores information related to the operation of the terminal 10, such as an operating system (OS) configured to boot up the terminal 10. The data region is a region in which data generated while the terminal 10 is being used is stored. As described above, information received from the service apparatus 20 may be temporarily stored in the data region. The storage unit 34 may be configured to include a storage medium, such as flash memory, a hard disk, multimedia card micro type memory (e.g., SD or XD memory), RAM, and/or ROM.

The display unit 35 displays information about a series of operating states and operation results generated while the terminal 10 is performing a function. In particular, the display unit 35 of the present invention may function to display various types of information provided by the service apparatus 20, for example, information about a process of accessing the service apparatus 20 and uploading content, a process of executing content via the service apparatus 20, and a process of downloading uploaded content from the service apparatus 20.

The display unit 35 may be implemented in the form of a single touch panel (or touch screen) along with the input unit 32 as described above, and may display various types of information generated in response to a manipulation of the input unit 32. The display unit 35 may include a liquid crystal display (LCD), a thin film transistor LCD (TFT-LCD), an organic light emitting diode (OLED), a light-emitting diode (LED), an active matrix organic LED (AMO-LED), a flexible display, and a three-dimensional display. Furthermore, some of these displays may be configured in a transparent or light-transmission form so that the outside can be viewed through them. In this case, these displays may be configured in the form of transparent displays including a transparent OLED (TOLED).

The principal components of the terminal 10 have been described above with reference to FIG. 3. However, all the components shown in FIG. 3 are not essential components of the terminal 10. The terminal 10 may be implemented using more components, such as a source sound output unit capable of converting a source sound, i.e., an electrical signal, into an analog signal and outputting the analog signal. The terminal 10 may be implemented using a number of components larger or smaller than the number of the aforementioned components.

The principal components and operation method of the service apparatus 20 according to an embodiment of the present invention are described below.

Figure 4:
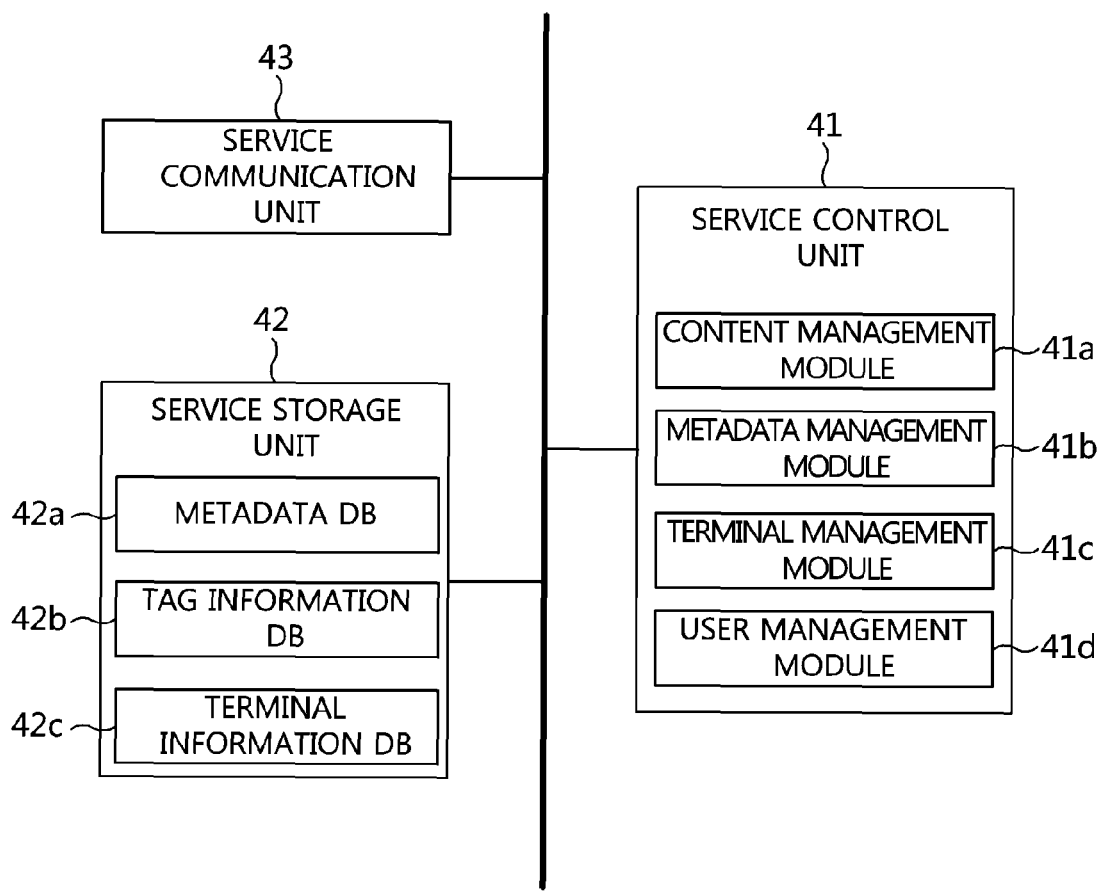
FIG. 4 is a block diagram showing the configuration of a service apparatus according to the present invention.

FIG. 4 is a block diagram showing the configuration of the service apparatus according to the present invention.

Referring to FIG. 4, the service apparatus 20 according to the present invention includes a service control unit 41, a service storage unit 42, and a service communication unit 43. In this case, the service control unit 41 includes a content management module 41a, a metadata management module 41b, a terminal management module 41c, and a user management module 41d. The service storage unit 42 includes a metadata DB 42a, a tag information DB 42b, and a terminal information DB 42c.

The service communication unit 43 functions to send and receive information related to the plurality of terminals 10 over the communication network 30. In particular, the communication unit 43 according to an embodiment of the present invention supports a function of receiving the metadata of content whose upload is requested by one terminal and requesting the transmission of the executable data of content in response to a request from another terminal.

The service storage unit 42 stores various types of information generated in a data transmission process based on cloud computing according to an embodiment of the present invention as described above, and may be configured to include the metadata DB 42a, the tag information DB 42b, and the terminal information DB 42c. In this case, the metadata DB 42a stores metadata extracted based on content uploaded by the terminal 10, and classifies and stores metadata on a per-terminal basis using terminal information. The metadata includes information about the object name, file format, range of the file size, file creation date, recent update date, execution resolution and playback time of the content. Furthermore, the tag information DB 42b stores information that is managed as the identification information of metadata. Furthermore, the terminal information DB 42c stores and manages information about terminals. In this case, the terminal information stored in the terminal information DB 42c may be configured to include terminal identification information, personal identification information, and user personal information, such as a place of residence, gender and a corresponding age group, that are input when a service subscription is made.

As described above, content uploaded by a plurality of terminals is not unconditionally stored in the service apparatus 20, but is stored after redundant data has been removed. Accordingly, a storage space can be used more efficiently.

Furthermore, the service storage unit 42 according to an embodiment of the present invention may be configured independently of the service apparatus 20, and may support a function of data transmission based on cloud computing. In this case, the service storage unit 42 may operate as separate high-capacity storage, and includes a control function adapted to perform an operation.

The service control unit 41 performs the overall control of the service apparatus 20 of the present invention. In particular, the service control unit 41 according to an embodiment of the present invention receives a request signal intended for the upload of specific content from at least one terminal. In this case, the service control unit 41 receives terminal information from the terminal 10, and recognizes a corresponding terminal 10 by checking the received terminal information.

The service control unit 41 classifies and extracts the metadata of content on a per-terminal basis in response to an upload request for the content. In this case, the service control unit 41 extracts the metadata using at least one metadata invocation method by considering a usage history and a data distribution processing situation. In this case, the metadata invocation method may be a partial meta-invocation control method. In this case, the partial meta-invocation control method is a method of minimizing the extraction of unnecessary metadata and reducing network traffic in such a manner that a terminal side does not extract the metadata of all the updated files but a server side limits the capacity, usage frequency, upload number and date of files from which metadata is to be extracted. The extraction of unnecessary metadata may be prevented because the terminal side does not extract metadata corresponding to all the updated files but a server selects the file type, capacity and usage frequency of files from which metadata is to be extracted. That is, when an update attributable to a change in content is requested by the terminal 10, the service control unit 41 cannot update all data, so that it may extract corresponding metadata so that only representative logic can be updated, and may apply the extracted metadata. In this case, the service control unit 41 extracts the corresponding metadata so that data that has been greatly changed compared to existing data can be updated first. That is, the service control unit 41 extracts metadata using a method of association between the service apparatus 20 and the terminals 10. In this case, an extraction type of keyword may be provided in the form of a mapping table including a numeral, an English letter and a special symbol. A selected item may be determined to be the frequent usage history of the service apparatus 20 and the user.

TABLE 1

| Object ID | File type | Range of File Size | File Creation Date | Update Date | Resolution | Playback Time |
|---|---|---|---|---|---|---|
| movie | moving image | 100 M or more | 100 days before | Jan. 13, 2006 | 1024 * 640 | 60 min |
| movie | source sound (music) | 5 M or more | 50 days before | Feb. 13, 2001 | | 5 min |
| photo | photo | 1 M or less | 20 days before | Feb. 13, 2010 | 1024 * 640 | |
| document | document | 200K or more | 7 days before | Feb. 13, 2010 | | |

Referring to Table 1, the metadata includes information about content, such as an object name, a file format, the range of a file size, a file creation date, a recent update date, execution resolution, and a playback time. That is, the object name included in the metadata is indicative of a name that can be used to identify content. The file format is classified and indicated as a moving image, a source sound, a photo, or a document. The range of a file size may be classified as a specific size or more, a specific size or less, less than the specific size, or more than the specific size based on the specific size. The file creation date may be indicative of the date on which the corresponding content was created. The recent update date is indicative of the date on which the content was recently updated. The resolution is indicative of the resolution at which the content is played back. The playback time may be indicated as the overall playback time or partial playback time of content.

For example, a moving image file that belongs to the metadata and that has the object name "movie" may be content that has a file size of 100 M or more, that was generated 100 days before a reference date, that was updated on Jan. 6, 2013, that has a resolution of 1024*640, and that is played back for 60 minutes. Furthermore, a source sound file that belongs to the metadata and that has the object name "music" may be content that has a file size of 5 M or more, that was generated 50 days before a reference date, that was updated on Feb. 1, 2013, and that is played back for 5 minutes. Furthermore, a photo file that belongs to the metadata and that has the object name "photo" may be content that has a file size of 1 M or less, that was generated 20 days before a reference date, that was updated on Feb. 10, 2013, and that has a resolution of 640*408. Furthermore, a document file that belongs to the metadata and that has the object name "document" may be content that has a file size of 200 K or more, that was generated 7 days before a reference date, and that was updated on Feb. 15, 2013.

The service control unit 41 designates tag information associated with the extracted metadata. Thereafter, the service control unit 41 stores the terminal information of the terminal 10 associated with content, the metadata of the content, and the tag information designated based on the metadata.

The service control unit 41 performs data interoperability between different terminals using tag information. In this case, the service control unit 41 receives a request for the download of specific content from at least one terminal, and checks tag information associated with the content in response to the request. Furthermore, the service control unit 41 identifies a terminal in which the executable data of the corresponding content has been stored based on metadata associated with the tag information, and requests the identified terminal to send the executable data for the content.

In order to perform the function of the service apparatus 20 more effectively, the service control unit 41 includes the content management module 41a, the metadata management module 41b, the terminal management module 41c, and the user management module 41d. In particular, the content management module 41a according to the present invention manages the attribute information of at least one piece of content. The metadata management module 41b extracts metadata for content, and manages the metadata in association with the terminal information of a terminal in which the executable data of the content has been stored. Furthermore, the terminal management module 41c manages the terminal information received from the terminal, and identifies the terminal in which the executable data of the content has been stored. Furthermore, the user management module 41d manages information about the usage history of the content for each user.

That is, the service apparatus 20 according to an embodiment of the present invention functions to perform connection in response to a request from a user so that data interoperability with each terminal 10 or another service apparatus that has the corresponding content is performed in the state in which a physical file has not been actually uploaded to a server and the terminal 10 or another service apparatus has the metadata of corresponding content in a cloud environment using metadata. Accordingly, when the service apparatus 20 is effectively managed, a reduction in the capacity of the service apparatus 20 and the effective operation of the service apparatus 20 may be expected. The data extracted from each terminal may be continuously extracted in a uniform form.

Furthermore, the service apparatus 20 configured as described above may be implemented as one or more servers operating in accordance with a server-based computing based method or a cloud method. In particular, data applied to the upload or download of content via a cloud computing apparatus may be provided via a cloud computing function that may be permanently stored in a cloud computing apparatus on the Internet. In this case, the cloud computing refers to a technology for serving information technology (IT) resources, for example, hardware (a server, storage, and a network), software (a database, security, and a web server), service, and data virtualized in digital terminals, such as a desktop, a table computer, a notebook, a net book and a smart phone, using Internet technology in an on-demand manner.

Meanwhile, the memory mounted on the terminal 10 or service apparatus 20 stores information within the terminal 10 or service apparatus 20. In the case of an implementation, the memory is a computer-readable medium. In an implementation, the memory may be a volatile memory unit. In the case of another implementation, the memory may be a non-volatile memory unit. In the case of an implementation, the storage device is a computer-readable medium. In various implementations, the storage device may include, for example, a hard disk device, an optical disk device, or any other high-capacity storage device.

Although the illustrative configuration of the apparatus has been shown in the present specification and the attached drawings, the functional operations and the implementations of the subject matter described in the present specification may be implemented in different types of digital electronic circuits, and may be implemented in the form of computer software, firmware, or hardware including the structures disclosed in the present specification and structural equivalents thereof or may be implemented by a combination of one or more thereof. The implementations of the subject matter described in the present specification may be implemented as one or more computer program products, i.e., one or more modules regarding computer program instructions encoded on a tangible storage medium in order to control the operations of the apparatus according to the present invention or perform execution based on the operations. The computer-readable medium may be a machine-readable storage device, a machine-readable storage board, a memory device, or a composition of substances influencing machine-readable radio wave-type signals, or a combination of one or more thereof.

Figure 5:
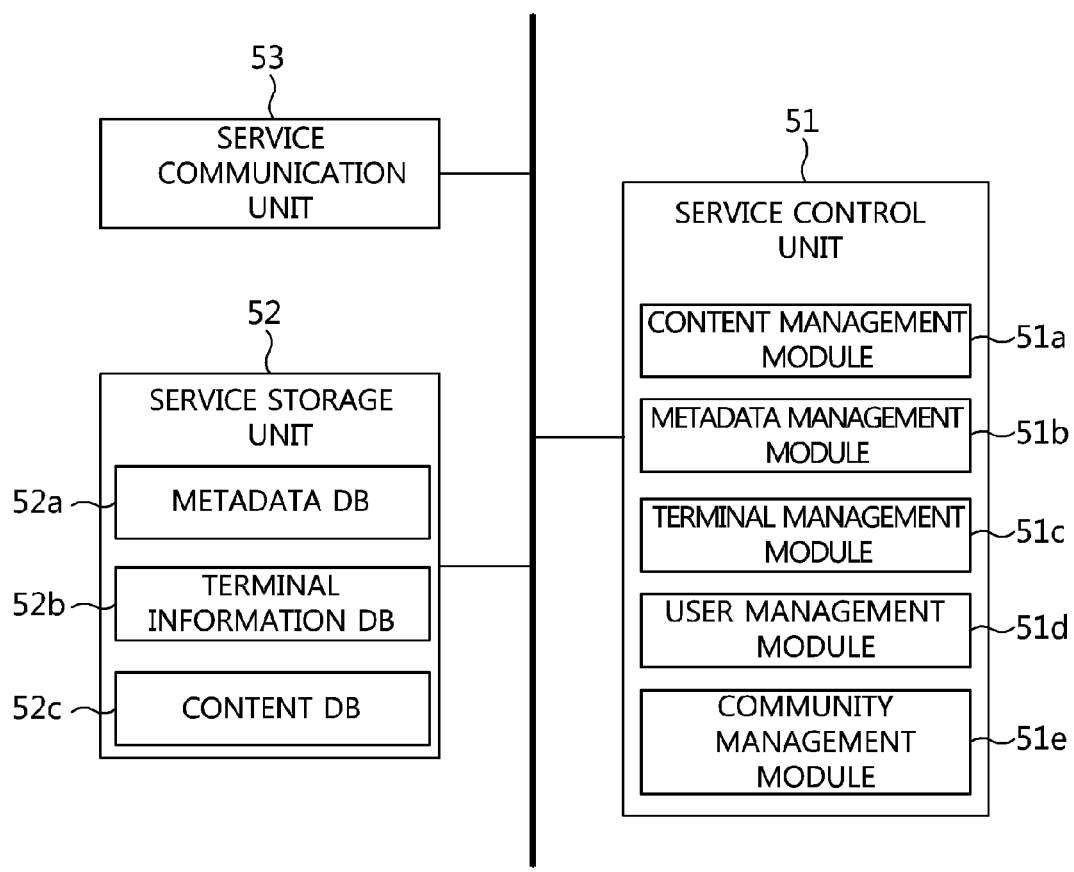
FIG. 5 is a block diagram showing the configuration of a service apparatus according to another embodiment of the present invention.

FIG. 5 is a block diagram showing the configuration of a service apparatus 20 according to another embodiment of the present invention.

Referring to FIG. 5, the service apparatus 20 according to the present invention includes a service control unit 51, a service storage unit 52, and a service communication unit 53. In this case, the service control unit 51 includes a content management module 51a, a metadata management module 51b, a terminal management module 51c, and a user management module 51d. The service storage unit 52 includes a metadata DB 52a, a terminal information DB 52b, and a content DB 52c.

The service communication unit 53 functions to send and receive information related to the plurality of terminals 10 over the communication network 30. In particular, the communication unit 53 according to an embodiment of the present invention supports a function of receiving the metadata of content whose upload is requested by one terminal and requesting the transmission of the executable data of the content in response to a request from the other terminal.

The service storage unit 52 stores various types of information generated in a data transmission process based on cloud computing according to an embodiment of the present invention as described above, and may be configured to include the metadata DB 52a, the terminal information DB 52b, and the content DB 52c. In this case, the metadata DB 52a stores metadata extracted based on content uploaded by the terminal 10, and classifies and stores metadata on a per-terminal basis using terminal information. The metadata includes information about the object name, file format, range of the file size, file creation date, recent update date, execution resolution and the playback time of the content. Furthermore, the terminal information DB 52b stores and manages information about terminals. In this case, the terminal information stored in the terminal information DB 52b may be configured to include terminal identification information, personal identification information, and user personal information, such as a place of residence, gender, and a corresponding age group input when a service subscription is made. Furthermore, the content DB 52c manages the executable data of content uploaded by terminals.

As described above, the content uploaded by a plurality of terminals is not unconditionally stored in the service apparatus 20, but is stored after redundant data has been removed. Accordingly, a storage space may be used more efficiently.

Furthermore, the service storage unit 52 according to an embodiment of the present invention may be configured independently of the service apparatus 20, and may support a function of data transmission based on cloud computing. In this case, the service storage unit 52 may operate as separate high-capacity storage, and includes a control function adapted to perform an operation.

The service control unit 51 performs the overall control of the service apparatus 20 of the present invention. In particular, the service control unit 51 according to an embodiment of the present invention receives a request signal intended for the upload of content from a specific terminal. In this case, the service control unit 51 receives terminal information from the terminal 10, and recognizes the corresponding terminal by checking the received terminal information.

The service control unit 51 checks whether the content identical to content has been stored in response to the signal requesting the upload. In this case, in order to check the attributes of the content, the service control unit 51 combines pieces of information, such as a file format, a playback time, resolution, a compression method, an encoding type, a file name, a file size and picture quality, and checks whether the content identical to the content has been stored by performing comparison.

Thereafter, if the content identical to the content whose upload has been requested has not been stored, the service control unit 51 extracts attribute information included in the content and metadata associated with the usage information of the content, and classifies and manages the extracted metadata on a per-terminal basis. In this case, the service control unit 51 stores the executable data of the content.

In this case, the metadata includes information about content, such as an object name, a file format, the range of a file size, a file creation date, a recent update date, execution resolution, a playback time, related terminal information, and related user information. That is, the object name included in the metadata is indicative of a name that is used to identify content. The file format is classified and indicated as a moving image, a source sound, a photo, or a document. The range of a file size may be classified into a specific size or more, the specific size or less, less than the specific size, and more than the specific size based on the specific size. The file creation date may be indicative of the date on which corresponding content was created. The recent update date is indicative of the date on which the content was recently updated. The resolution is indicative of the resolution at which content is played back. The playback time may be indicated as the overall playback time or partial playback time of content. Furthermore, the related terminal information and user information may be information about a terminal, in which corresponding content has been stored, and user information related to the terminal, respectively.

If the content identical to the content has been stored, the service control unit 51 performs management so that the content is shared between terminals. In this case, the service control unit 51 provides the terminal information and user information of another terminal in which the content has been stored.

The service control unit 51 supports a community service between terminals in which shared content has been stored. That is, the service control unit 51 may provide a community service, such as a social network service or an instant messenger, between terminals in which the identical content has been stored.

In order to perform the function of the service apparatus 20 more effectively, the service control unit 51 includes the content management module 51a, the metadata management module 51b, the terminal management module 51c, the user management module 51d, and a community management module 51e. In particular, the content management module 51a according to the present invention manages the attribute information of at least one piece of content. The metadata management module 51b extracts metadata from content, and manages metadata in association with the terminal information of a terminal in which the content has been stored. Furthermore, the terminal management module 51c manages terminal information received from the terminal, and identifies the terminal in which content has been stored. Furthermore, the user management module 51d manages usage information about the content for each user. Furthermore, the community management module 51e performs support so that terminals that upload or download the identical content share data via a social network service or instant messenger function.

Furthermore, the service apparatus 20 configured as described above may be implemented as one or more servers operating in accordance with a server-based computing-based method or a cloud method. In particular, the data applied to the upload or download of content via a cloud computing apparatus may be provided via a cloud computing function that may be permanently stored in a cloud computing apparatus on the Internet. In this case, the cloud computing refers to a technology for serving information technology (IT) resources, for example, hardware (a server, storage, and a network), software (a database, security, and a web server), service, and data virtualized in digital terminals, such as a desktop, a table computer, a notebook, a net book and a smart phone, using Internet technology in an on-demand manner.

Meanwhile, the memory mounted on the terminal 10 or the service apparatus 20 stores information within the terminal 10 or the service apparatus 20. In the case of an implementation, the memory is a computer-readable medium. In an implementation, the memory may be a volatile memory unit. In the case of another implementation, the memory may be a non-volatile memory unit. In the case of an implementation, the storage device is a computer-readable medium. In various implementations, the storage device may include, for example, a hard disk device, an optical disk device, or any other high-capacity storage device.

Although the illustrative configuration of the apparatus has been shown in the present specification and the attached drawings, the functional operations and the implementations of the subject matter described in the present specification may be implemented in different types of digital electronic circuits, and may be implemented in the form of computer software, firmware, or hardware including the structures disclosed in the present specification and structural equivalents thereof or may be implemented by a combination of one or more thereof. The implementations of the subject matter described in the present specification may be implemented as one or more computer program products, i.e., one or more modules regarding computer program instructions encoded on a tangible storage medium in order to control the operations of the apparatus according to the present invention or perform execution based on the operations. The computer-readable medium may be a machine-readable storage device, a machine-readable storage board, a memory device, or a composition of substances influencing machine-readable radio wave-type signals, or a combination of one or more thereof.

Figure 6:
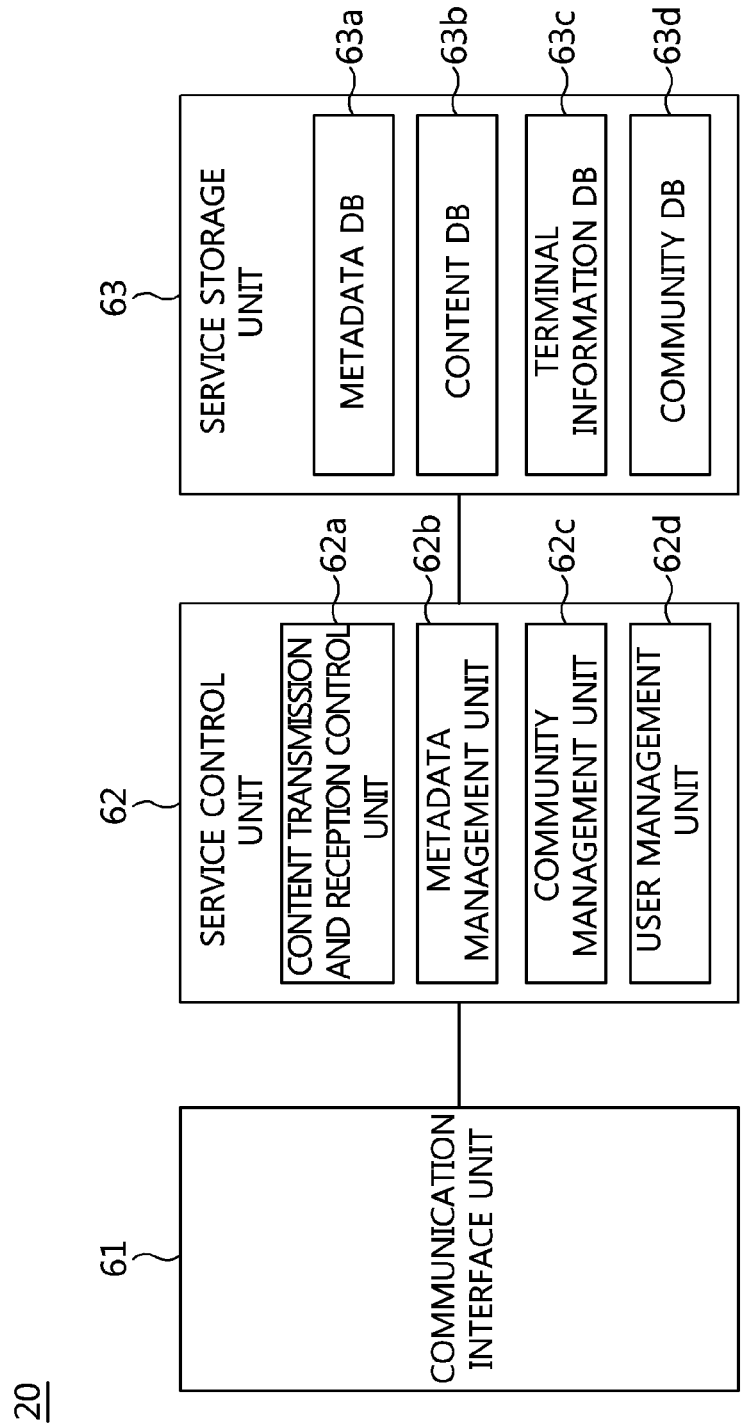
FIG. 6 is a block diagram showing the configuration of a service apparatus according to yet another embodiment of the present invention.

FIG. 6 is a block diagram showing the configuration of a service apparatus according to yet another embodiment of the present invention.

Referring to FIGS. 1 and 6, the service apparatus 20 of the present invention may include a communication interface unit 61, a service control unit 62, and a service storage unit 63. In this case, the service control unit 62 may be configured to include a content transmission and reception control unit 62a, a metadata management unit 62b, a community management unit 62c, and a user management unit 62d.

Each of the components is described in greater detail. First, the communication interface unit 61 supports a function of sending and receiving information related to the plurality of terminals 10 over the communication network 30. In particular, the communication interface unit 61 according to an embodiment of the present invention supports a function of receiving content from any one terminal 10 and transferring the content to the content transmission and reception control unit or sending the content to the terminal 10 in response to a request from the terminal 10.

The service control unit 62 performs the overall control of the service apparatus 20 of the present invention. The service control unit 62 may be configured to include the content transmission and reception control unit 62a, the metadata management unit 62b, the community management unit 62c, and the user management unit 62d.

First, the content transmission and reception control unit 62a controls a process of storing content, received from the terminal 10 via the communication interface unit 61, in the service storage unit 63 and sending content, stored in the service storage unit 63, to the terminal 10 via the communication interface unit 61 in response to a request from the terminal 10.

In particular, the content transmission and reception control unit 62a according to an embodiment of the present invention may perform control so that only executable data required for the execution of content, selected from the executable data required for the execution of the content and the attribute information of the content included in the content received from the terminal 10, is stored in the content DB 63b of the service storage unit 63, and may perform control so that metadata, which is extracted via the metadata management unit 62b to be described later and which includes the attribute information of the content and tag information designated using the metadata, are stored in a metadata DB 63a.

In addition, the content transmission and reception control unit 62a of the present invention may manage whether to directly or indirectly transmit data via the communication interface unit 61, and may provide a transmission function through storage on a file block basis.

When content is received from the terminal 10 via the communication interface unit 61, the metadata management unit 62b extracts metadata from the received content. In this case, the metadata of the content refers to structured data regarding the content, which is extracted using the attribute information and content usage information of the content and the terminal information received from the terminal 10.

This is described in greater detail. The content received from the terminal 10 includes executable data required for the execution of the content and content information including the attribute information of the content, and also includes content usage information, i.e., information based on a content usage history.

In this case, the executable data required for the execution of the content refers to pure source data required to execute the content. The attribute information of the content is information related to the executable data of the content, and includes, for example, information about the time at which the content was first created, information about an author who created the content, source information, and the absolute path information, object size and object type folder of the content. In addition, the attribute information may include any one of an audio codec, a video codec, format information, resolution, a sample rate and a file format related to the content.

Furthermore, the content usage information, i.e., information based on a content usage history, may include any one of recent access time information, usage frequency information and recent modification time information regarding the content. Furthermore, the content usage information may further include recent access time information and recent modification time information after the content has been uploaded.

Furthermore, the terminal information required for the authentication of the user of the terminal 10 may be terminal identification information, terminal device information, or terminal specification information, such as an electronic serial number (ESN) or a mobile identification number (MIN), and may further include a service subscription ID and a password input by a user. Furthermore, the terminal information may further include member information, such as the gender and age of the user of the terminal 10 previously stored in association with the terminal information.

The metadata management unit 62b extracts metadata based on the aforementioned content information, content usage information, and terminal information. In this case, the metadata management unit 62b extracts the metadata using the attribute information and content usage information of the content and the terminal information, other than the executable data required for the execution of content, selected from the content information, and transfers the extracted metadata to the content transmission and reception control unit 62a so that the metadata is stored in the service storage unit 63 in association with the terminal information.

In addition, the metadata management unit 62b designates tag information, i.e., the associated information of the content, based on the metadata extracted in association with the content.

For example, if the content is a music video of a specific singer and the singer is a singer who has a sexy image, the tag information associated with the content may be designated as sexy, an S star, or a sexy dance. Furthermore, if the content is content frequently executed by the user of the terminal 10, the tag information associated with the content may be designated as a favorite or my favorite.

TABLE 2

| CONTENT | FILE FORMAT | SOURCE | FREQUENCY | AGE | GENDER | SINGER | GENRE |
|---|---|---|---|---|---|---|---|
| music video | MPEG | www.O.co.kr | daily | twenties | male | S star | ballad |

In Table 2, the content, the file format, the source, the frequency, the age, the gender, the singer, and the title name are metadata extracted based on content information, content usage information, and terminal information. The metadata management unit 62b designates tag information associated with the content using the metadata. For example, a singer who appears on a music video is a singer who has a sexy image, the genre of the music video is a ballad, and the music video is a music video daily viewed by a male in their twenties. Accordingly, "sexy, a singer favored by a male in their twenties, a sexy ballad" may be designated as corresponding tag information.

Thereafter, the metadata management unit 62b transfers the extracted metadata and the tag information, designated using the metadata, to the content transmission and reception control unit 62a. The content transmission and reception control unit 62a that has received the extracted metadata and the tag information performs control so that the metadata and the tag information extracted using the metadata are stored in the tag information DB of the service storage unit 63, and performs control so that the executable data required for the execution of the content is stored in the content DB 63b.

Furthermore, the metadata management unit 62b transfers the tag information associated with the content to the community management unit 62c in order to provide notification that the tag information has been designated in association with the content.

The community management unit 62c functions to analyze the interest of the user of the terminal 10 using the tag information designated in association with the content, and also functions to support the generation of a community in conjunction with another user who has an interest similar to that of the user of the terminal 10.

For example, when the metadata management unit 62b has designated tag information as "sexy, a singer favored by a male in their twenties, a sexy ballad" in accordance with content A received from the first terminal 10a, the community management unit 62c searches the metadata DB 63a in order to check whether a user including tag information similar to the tag information is present via a previously stored tag list. In this case, when tag information designated in association with content B received from the second terminal 10b has been designated as "sexy, a singer favored by a male in their twenties, a sexy ballad", it may be seen that the user of the first terminal 10a and the user of the second terminal 10b have similar interests.

When the terminal of another user who has an interest similar to that of the user of the first terminal 10a, for example, the second terminal 10b, is found, the community management unit 62c supports the generation of a community between the users. For example, while a service page is being provided to the first terminal 10a, a menu, such as "viewing other friends who have interests similar to my interest," may be provided. When the user of the first terminal 10a plays back uploaded content, a message, such as "AAA also likes moving images. Let us create a community," may be sent to the first terminal 10a.

Thereafter, the user of the first terminal 10a may send a community generation request message to a user who has an interest similar to that of the user of the first terminal 10a. In response to the request, another user, for example, the user of the second terminal 10b, may agree with the generation of a community, and thus the community may be created between the first terminal 10a and the second terminal 10b. After the community has been created, a storage space allocated to the first terminal 10a and a storage space allocated to the second terminal 10b may be shared, or a separate space may be allocated and used.

In this case, the terminal of another user, for example, the user of the second terminal 10b, has previously agreed with the generation of a community in response to the request from the user. The community management unit 62c searches for another user, who has an interest similar to that of the user of the first terminal 10a, among other users designated as agreeing with the generation of a community.

Furthermore, in an embodiment of the present invention, although the tag information has been illustrated as being designated by the metadata management unit 62b of the service control unit 62, it is not limited thereto. The user may directly designate the tag information.

Accordingly, the service apparatus 20 according to an embodiment of the present invention checks the interest of a user based on content uploaded by the user, recommends a user who has a similar interest, and automatically creates a community between users, thereby providing users with a new additional service and also creating new business.

Furthermore, the service apparatus 20 according to an embodiment of the present invention separately manages executable data required for the execution of content, and the content information of the content, metadata extracted based on content usage information and tag information. That is, the service apparatus 20 manages executable data required for the execution of content and metadata in a separate independent manner. Accordingly, the service apparatus 20 may redundantly generate only metadata when redundant content is uploaded by a plurality of users, and manages executable data for actual execution without redundancy, thereby using a storage space more efficiently.

In addition, the service control unit 62 of the present invention may be configured to include the user management unit 62d that supports user authentication and user management. In this case, the user management unit 62d supports the service subscription of a user. Once it is determined that the access of the terminal 10 has been made, the user management unit 62d may perform user authentication based on terminal information received from the terminal 10. Furthermore, the user management unit 62d may function to allocate a storage space to the terminal 10 or manage a previously allocated storage space, based on determine user subscription information.

Furthermore, although not shown in the drawings, a billing unit (not shown) configured to perform a billing process attributable to service usage based on at least any one of information for each storage medium, information for each usage period, information for each access method, and information for each transmission and reception speed may be further included.

The service storage unit 63 stores various types of information generated in the community generation process based on cloud computing according to an embodiment of the present invention as described above, and may be configured to include the metadata DB 63*a*, the content DB 63*b*, a terminal information DB 63*c*, and a community DB 63*d*.

In this case, the metadata DB 63*a* stores metadata extracted based on content received from the terminal 10 and tag information extracted based on the metadata, and stores the information in association with terminal information. The content DB 63*b* stores executable data, i.e., source data required for the execution of content, and stores the executable data in association with terminal information. In this case, the number of pieces of terminal information stored in association with single piece of executable data may be plural. For example, when content A is received from each of the first terminal 10*a* and the second terminal 10*b* and the two pieces of content A received from the first terminal 10*a* and the second terminal 10*b* are the same, the two pieces of executable data of the two pieces of content A are the same. However, metadata and tag information regarding the content A received from the first terminal 10*a* and metadata and tag information regarding the content A received from the second terminal 10*a* may be different. For example, the usage frequency and source of the content A received from the first terminal 10*a* may be different from those of the content A received from the second terminal 10*a*, and pieces of information, such as the genders and age groups of the users of the first terminal 10*a* and the second terminal 10*b*, may be different from each other. Accordingly, pieces of metadata extracted based on various types of information are different, and pieces of tag information extracted based on the pieces of metadata are different. Accordingly, the pieces of executable data of the pieces of content are stored after the redundancy between the pieces of contents has been removed, and the number of pieces of terminal information of the terminals that have uploaded the pieces of content may be plural.

As described above, the pieces of content uploaded by the plurality of terminals are not unconditionally stored in the service apparatus 20, but redundant executable data required for execution is removed and then stored. Accordingly, a storage space may be used more efficiently.

The terminal information DB 63*c* stores and manages only terminal information. In this case, the stored terminal information may be configured to include terminal identification information, personal identification information, and user personal information, such as a place of residence, gender, and an age group input when a service subscription is made.

The community DB 63*d* stores various types of information related to a community created via the community management unit 62*c*.

The principal components and operation method of the service apparatus 20 according to an embodiment of the present invention have been described above.

The service apparatus 20 according to an embodiment of the present invention has the same configuration as a common web server or network server in term of hardware. However, in terms of software, the service apparatus 20 includes a program module implemented using a language, such as C, C++, Java, Visual Basic, or Visual C. The service apparatus 20 may be implemented in the form of a web server or network server. In general, the web server is connected to an unspecified number of clients and/or other servers over an open computer network, such as the Internet, and refers to a computer system configured to receive task execution requests from the clients or other web servers and obtain and provide corresponding task results and computer software (a web server program) installed to be used for the computer system. However, the web server must be understood as corresponding to a wide concept including a series of application programs operating on the web server and various databases constructed in the web server in some cases, as well as the aforementioned web server program. The service apparatus 20 may be implemented in common hardware for a server using a web server program provided in one of various manners depending on operating systems, such as DOS, Windows, Linux UNIX, and Macintosh. Typically, a website and an Internet information server (IIS) used in a WINDOWS environment and CERN, NCSA and APPACH used in a UNIX environment may be used. Furthermore, the plurality of databases (DB) included in the service apparatus 20 may be implemented inside or outside the service apparatus 20. In this case, the service storage unit 63 may be used as a database implemented inside the service apparatus 20 as described above. Such a database refers to a common data structure implemented in the storage space (a hard disk or memory) of a computer system using a database management program (DBMS), and refers to a data storage form in which data may be freely searched for (extracted), deleted, edited and added. The database may be implemented in accordance with the object of the present embodiment using a relational database management system (RDBMS), such as Oracle, Infomix, Sybase, or DB2, an object-oriented database management system (OODBMS), such as Gemston, Orion or O2, and an XML Native Database, such as Excelon, Tamino or Sekaiju, and may include appropriate fields or components in order to achieve its function.

In addition, the service apparatus 20 of the present invention may be implemented using one or more servers supporting a community generation method based on cloud computing. In particular, information sent and received via the system 100 for generating a community based on cloud computing according to the present invention may be provided via a cloud computing function that is permanently stored in a cloud computing apparatus. In the present invention, all the pieces of information sent and received between the terminal 10 and the service apparatus 20 may be stored in a cloud computing apparatus on the Internet, and may be transmitted anywhere and at any time.

Figure 7:
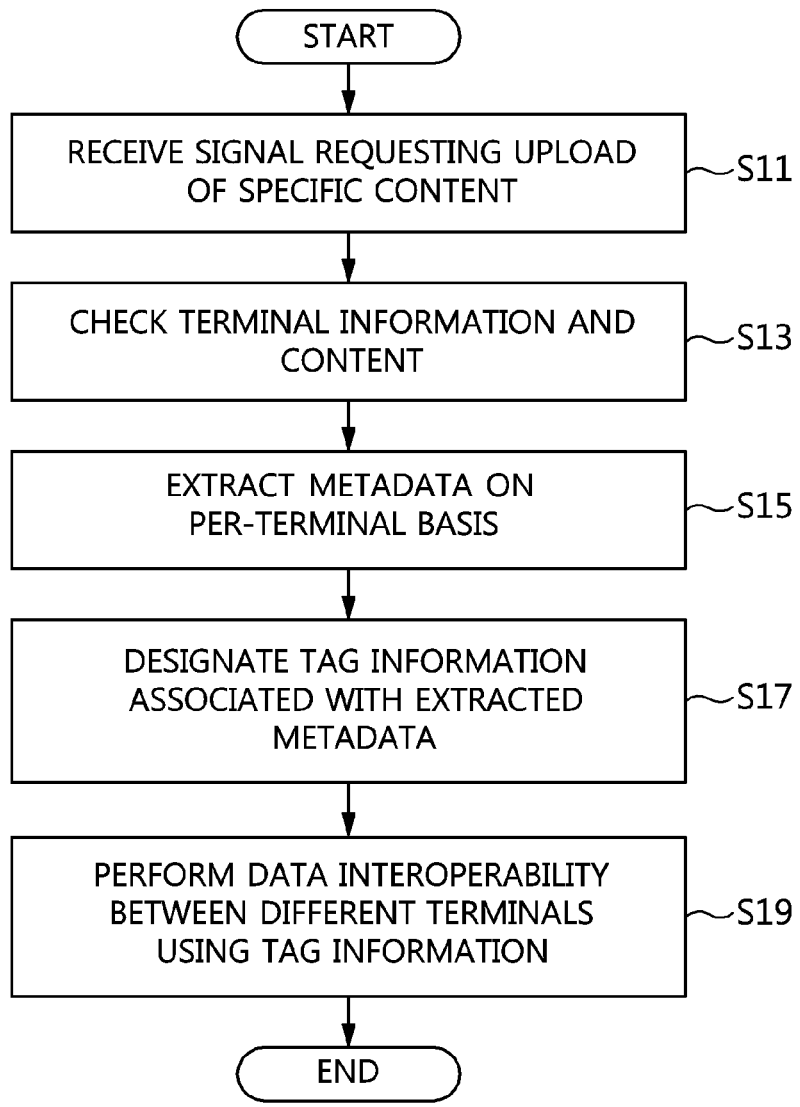
FIG. 7 is a flowchart showing a data management method based on cloud computing according to an embodiment of the present invention.

FIG. 7 is a flowchart showing a data management method based on cloud computing according to an embodiment of the present invention. In this case, data management may be based on a concept including data transmission.

Referring to FIG. 7, in the data management method based on cloud computing according to the present invention, first, the service apparatus 20 receives a signal requesting the upload of specific content from at least one terminal at step S11. At step S13, the service apparatus 20 receives terminal information from the terminal 10 along with the signal, and recognizes the corresponding terminal 10 by checking the received terminal information.

At step S15, the service apparatus 20 classifies and extracts the metadata of the content on a per-terminal basis in response to the upload request for the content. In this case, the service apparatus 20 extracts the metadata via at least one piece of logic in which a usage history and a data distribution processing situation have been taken into consideration. That is, when an update attributable to a change in content is requested by the terminal 10, the service apparatus 20 may extract corresponding metadata so that only representative logic is updated because all the data is unable to be updated, and may apply the extracted metadata.

In this case, the service apparatus 20 extracts the corresponding metadata so that data that has been greatly changed compared to existing data is updated first. For example, the metadata includes information about the content, such as an object name, a file format, the range of a file size, a file creation date, a recent update date, execution resolution, and a playback time. That is, the service apparatus 20 extracts the metadata using an association method between the service apparatus 20 and the terminals 10. In this case, an extraction type of keyword may be provided in the form of a mapping table including a numeral, an English letter and a special symbol. A selected item may be determined to be the frequent usage history of the service apparatus 20 and the user.

The service apparatus 20 designates tag information associated with the extracted metadata at step S17. Thereafter, the service apparatus 20 stores the terminal information of the terminal 10 that is associated with the content, the metadata of the content, and the tag information designated based on the metadata.

The service apparatus 20 performs data interoperability between different terminals using the tag information at step S19.

Figure 8:
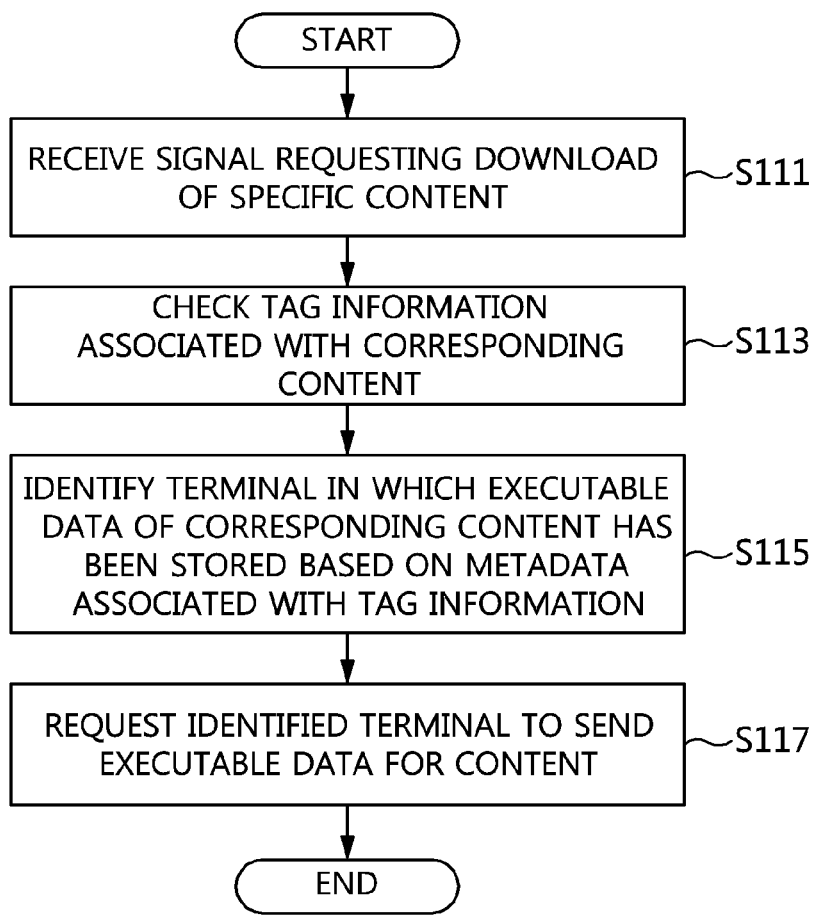
FIG. 8 is a detailed flowchart showing a data interoperability process performed between terminals according to an embodiment of the present invention.

FIG. 8 is a detailed flowchart showing a data interoperability process performed between terminals according to an embodiment of the present invention.

Referring to FIG. 8, in the data interoperability process between terminals according to the present invention, first, the service apparatus 20 receives a signal requesting the download of specific content from at least one terminal at step S111. Furthermore, the service apparatus 20 checks tag information associated with the content in response to the request at step S113.

At step S115, the service apparatus 20 identifies a terminal, in which the executable data of the corresponding content has been stored, based on metadata associated with the tag information. Thereafter, the service apparatus 20 requests the identified terminal to send the executable data for the content at step S117.

Figure 9:
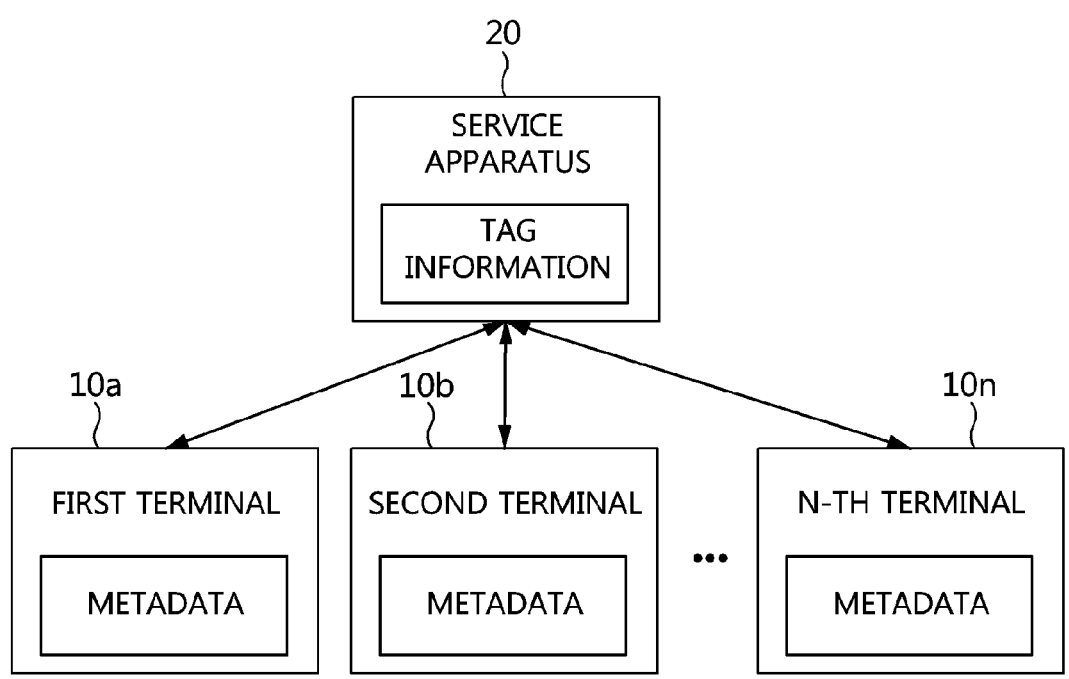
FIG. 9 is an exemplary diagram showing a data management method based on cloud computing according to an embodiment of the present invention.

FIG. 9 is an exemplary diagram showing a data management method based on cloud computing according to an embodiment of the present invention.

As shown in FIG. 9, in the present invention, content present in each terminal is extracted as metadata, and the extracted metadata is managed in the service apparatus (cloud storage 20) as tag information. Furthermore, when a user requests an upload and remote transmission is performed between terminals, physical data may be moved. In this case, all the physical data is not stored in the service apparatus 20, and thus an advantage arises in that the capacity of a server can be reduced.

For example, when 5 photos are deleted from the terminal 10 and three new photos are photographed and stored in the terminal 10, an additional event occurs, the terminal 10 is frequently subjected to extraction, and new data update needs to be consistently performed in the service apparatus 20. Accordingly, the present invention may reduce extraction nodes by differently extracting metadata on a per-terminal basis, and may also optimize and provide an update process in the service apparatus 20 on a per-system basis. For this purpose, the service apparatus 20 provides a metadata extraction function to the terminal 10. That is, the service apparatus 20 extracts metadata using an association method between the service apparatus 20 and the terminals 10. In this case, an extraction type of keyword may be provided in the form of a mapping table including a numeral, an English letter and a special symbol. A selected item may be determined to be the frequent usage history of the service apparatus 20 and the user.

Figure 10:
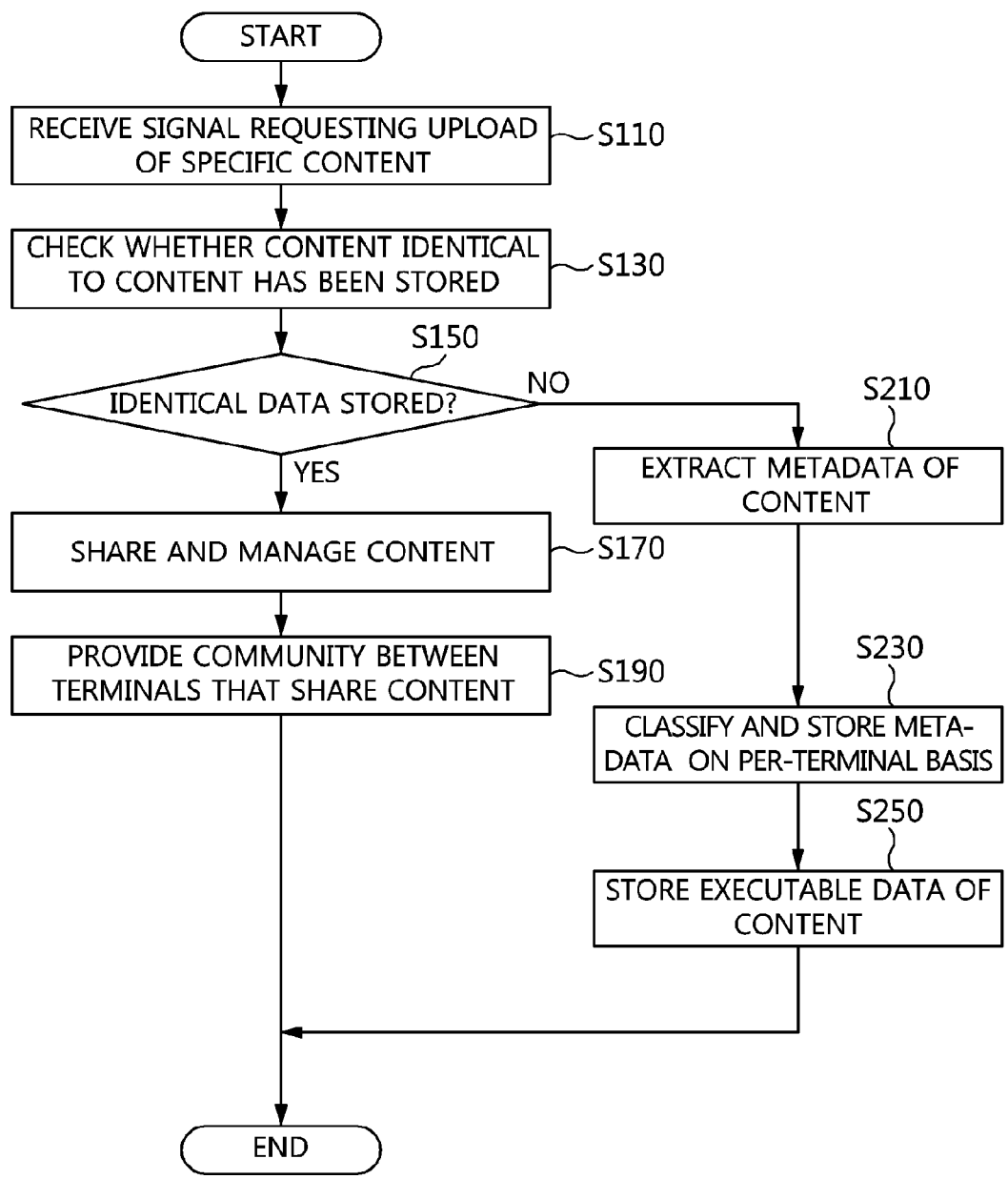
FIG. 10 is a flowchart showing a data management method based on cloud computing according to another embodiment of the present invention.

FIG. 10 is a flowchart showing a data management method based on cloud computing according to another embodiment of the present invention.

Referring to FIG. 10, in the data management method based on cloud computing according to the present invention, first, the service apparatus 20 receives a signal requesting the upload of content from a specific terminal at step S110. In this case, the service apparatus 20 receives terminal information from the terminal 10, and recognizes the corresponding terminal by checking the received terminal information.

The service apparatus 20 checks whether the content identical to the content has been stored in response to the signal requesting the upload at steps S130 to S150. In this case, in order to check the attributes of the content, the service apparatus 20 combines pieces of information, such as a file format, a playback time, resolution, a compression method, an encoding type, a file name, a file size, and picture quality, and checks whether the content identical to the content has been stored by performing comparison.

If the content identical to the content whose upload has been requested has been stored, the service apparatus 20 performs management so that the content is shared between terminals at step S170. In this case, the service control unit 51 provides the terminal information and user information of another terminal in which the content has been stored.

Furthermore, the service apparatus 20 supports a community service between the terminals in which the shared content has been stored at step S190. That is, the service apparatus 20 may provide a community service, such as a social network service or an instant messenger, between the terminals in which the identical content has been stored.

Meanwhile, when the content identical to the content whose upload has been requested has not been stored, the service apparatus 20 extracts attribute information included in the content and metadata associated with the usage information of the content at step S210. Furthermore, the service apparatus 20 classifies and stores the extracted metadata on a per-terminal basis at step S230. Thereafter, the service apparatus 20 stores the executable data of the content at step S250.

Figure 11:
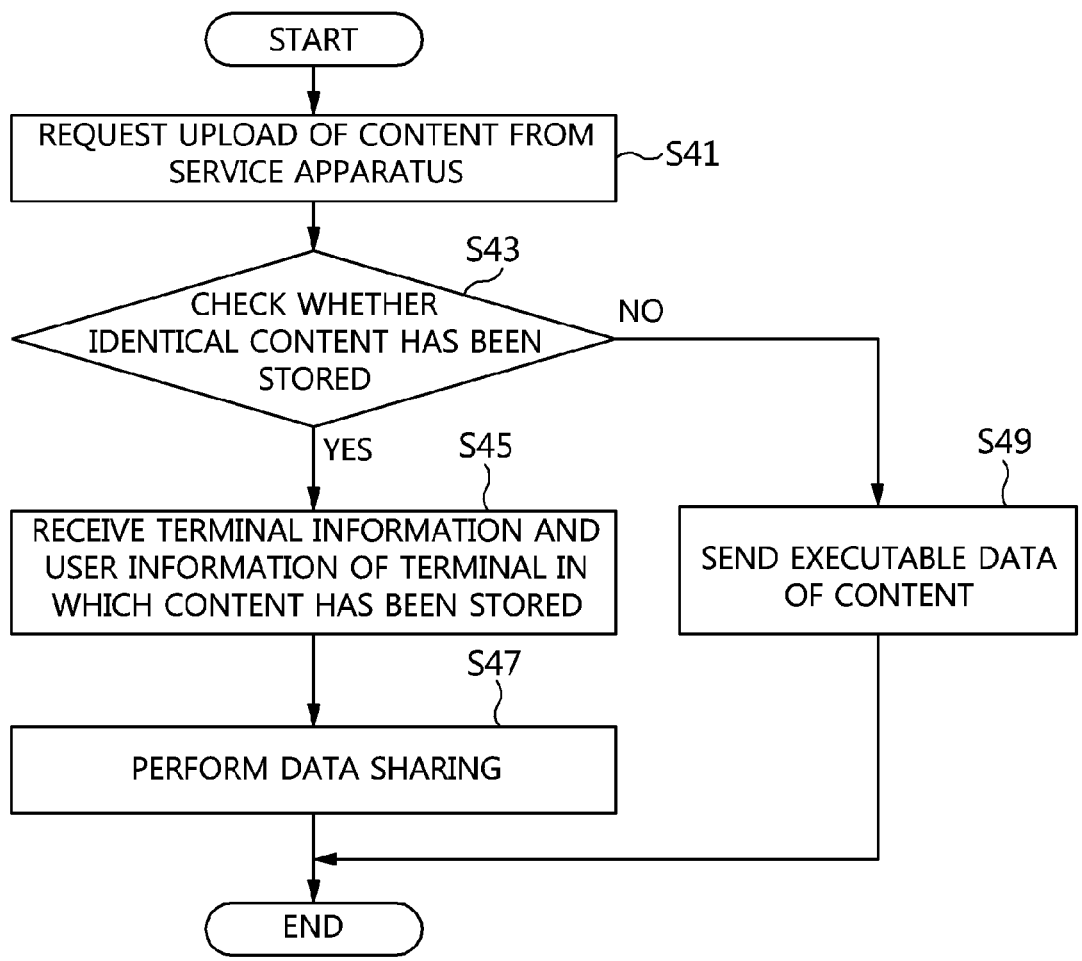
FIG. 11 is a flowchart showing a terminal operation method according to an embodiment of the present invention.

FIG. 11 is a flowchart showing a terminal operation method according to an embodiment of the present invention.

Referring to FIG. 11, the terminal 10 according to an embodiment of the present invention requests the upload of at least one piece of content from the service apparatus 20 at step S41. In this case, the terminal 10 checks whether the identical content has been stored at step S43. If the identical content has been stored, the terminal 10 receives the terminal information and user information of the terminal in which the content has been previously stored at step S45.

Thereafter, the terminal 10 checks the received terminal information and user information and then performs data sharing at step S47.

Meanwhile, if the content identical to the content whose upload has been requested has not been stored, the terminal 10 may send the executable data of the content to the service apparatus 20 so that the content is managed at step S49.

Figure 12:
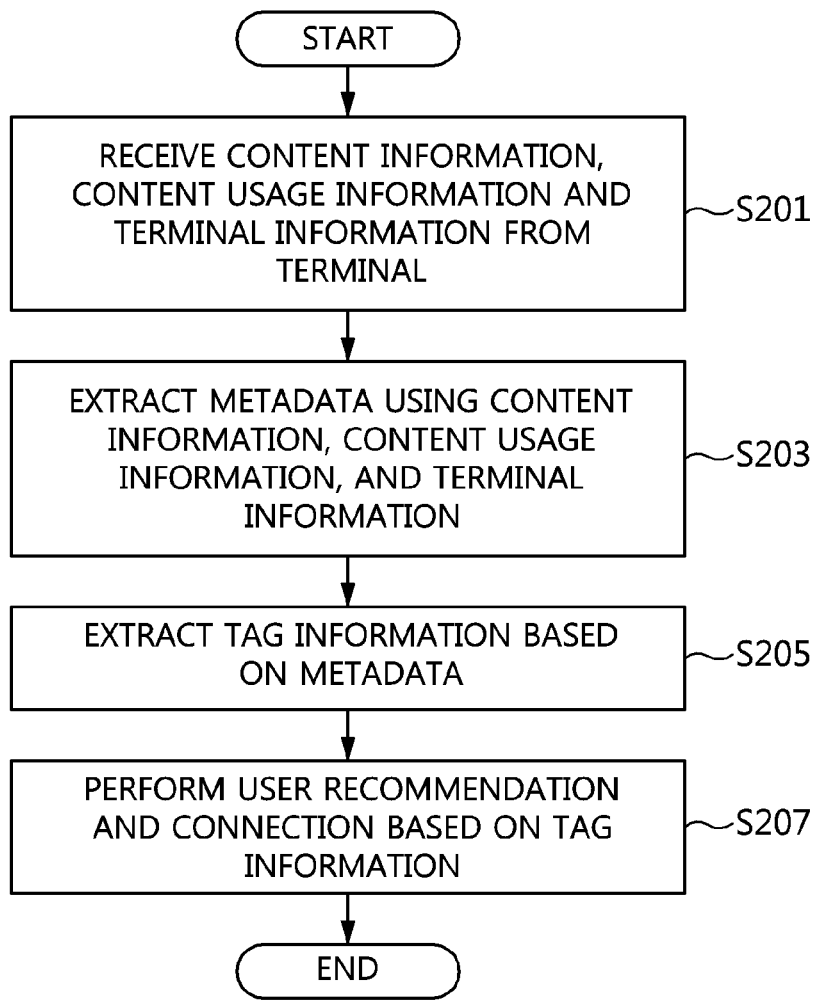
FIG. 12 is a flowchart showing a community generation method based on cloud computing according to an embodiment of the present invention.

FIG. 12 is a flowchart showing a community generation method based on cloud computing according to an embodiment of the present invention. The community generation method shown in FIG. 12 may correspond to some of the data management method based on cloud computing in FIG. 7, 10, or 11.

Referring to FIGS. 1 and 12, first, the service apparatus 20 receives content from any one terminal 10 at step S201. In this case, the content may be configured to include executable data required for the execution of the content, content information including the attribute information of the content, and content usage information, i.e., information based on a content usage history. In addition, the service apparatus 20 may receive terminal information from the terminal 10 before the reception of the content, and may receive the terminal information simultaneously with the reception of the content.

Thereafter, the service apparatus 20 extracts metadata based on the content information, the content usage information, and the terminal information at step S203. In this case, the extracted metadata may be: any one of information about a time at which the content was first created, information about an author who created the content, source information, the absolute path, the object size and object type folder of the content, an audio codec, a video codec, format information, resolution, a sample rate and a file format related to the playback of the content; any one of a recent modification time, usage frequency information and recent modification information before the upload of the content, a recent access time and a recent modification time after the uploaded, and pieces of information about the genre, title, player and singer of the content designated by the user of the terminal; and any one of pieces of information about gender, an age group, hobbies and a place of residence related to the personal information of the user of the terminal.

Thereafter, the service apparatus 20 extracts tag information based on the metadata. The tag information may be designated as, for example, "Ji-Sung, soccer player" or "sexy, a singer favored by a male in their twenties, a sexy ballad" in the form of words associated with the content.

Thereafter, the service apparatus 20 performs control so that the metadata extracted in association with the content and the tag information designated based on the metadata are stored in the tag information DB, and performs control so that the executable data required for the execution of the content is stored in the content DB.

Thereafter, the service apparatus 20 may control an overall process of checking the interest of the user based on the tag information, recommending another user who has an interest similar to that of the user, and performing a connection in order to create a community at step S207.

A computer-readable medium suitable for storing computer program instructions and data, for example, a storage medium, includes magnetic media, such as a hard disk, a floppy disk and a magnetic tape, optical media, such as compact disk read only memory (CD-ROM) and a digital video disk (DVD), magneto-optical media, such as a floptical disk, and semiconductor memory, such as read only memory (ROM), random access memory (RAM), flash memory, erasable programmable ROM (EPROM) and electrically erasable programmable ROM (EEPROM). The processor and the memory may be supplemented by a special-purpose logic circuit, or may be integrated into a special-purpose logic circuit. Examples of the program instructions include machine code, such as code created by a compiler, and high-level language code executable by a computer using an interpreter. The hardware devices may be configured to operate as one or more software modules in order to perform the operations of the present invention, and the vice versa.

Although the present specification includes the details of a plurality of specific embodiments, the details should not be construed as limiting any invention or a scope that can be claimed, and on the contrary, the details should be construed as being descriptions of features that may be specific to the specific embodiments of specific inventions. Specific features described in the present specification in the context of individual embodiments may be combined and implemented in a single embodiment. On the contrary, various features described in the context of a single embodiment may be implemented in a plurality of embodiments individually or in any appropriate lower-level combination. Furthermore, although features may operate in a specific combination and features may be initially depicted as being claimed, one or more features of a claimed combination may be excluded from the combination in some cases, and the claimed combination may be changed into a lower-level combination or a modification of the lower-level combination.

In the same manner, although operations are depicted in specific order in the drawings, it should not be understood that the operations must be performed in the depicted specific or sequential order or all the shown operations must be performed in order to obtain a preferred result. In a specific case, multi-tasking and parallel processing may be advantageous. Furthermore, it should not be understood that the separation of various system components of the aforementioned embodiments is required for all the embodiments. Rather, it should be understood that the aforementioned program components and systems may be integrated into a single software product or packaged into a multiple software product.

Meanwhile, the embodiments of the present invention disclosed in the present specification and the drawings are intended merely to present specific examples in order to help to understand the present invention, but are not intended to limit the scope of the present invention. It will be apparent to those skilled in the art that various modifications based on the technical spirit of the present invention, as well as the disclosed embodiments, can be made.

INDUSTRIAL APPLICABILITY

In the present invention, when a user uploads or downloads content to or from a metacloud-type storage server, data interoperability between terminals is performed using tag information associated with the metadata of the corresponding content. Using this, metadata is differently extracted for each terminal, for each time, or for each user, so that the present invention can minimize a load between a terminal and a server, and can smoothly provide a metacloud function. Furthermore, centralized requirements can be simultaneously applied to all terminals by controlling a metadata extraction target using a server, so that uniform service quality can be provided. Furthermore, metadata is extracted from content uploaded by a user and then tag information associated with the metadata is stored and managed on a per-terminal basis, so that redundant content storage can be prevented and the storage space of a server can be used more efficiently. The interests of users are determined based on content uploaded by the users, users who have similar interests are recommended, and a community between the users is automatically generated, so that a new additional service can be provided to users and new business can be created. Accordingly, the present invention has industrial applicability because the present invention has a sufficient possibility of marketing and business and it is apparent that the present invention can be practiced in reality.

The invention claimed is:

1. A service apparatus, comprising:
a service communication unit configured to send and receive data used for content sharing by communicating with at least one terminal; and
a service control unit configured to perform control so that a request for an upload of specific content is received from the at least one terminal, metadata of the content is classified and extracted on a per-terminal basis in response to the request, tag information associated with the extracted metadata is designated, and data interoperability between different terminals is performed using the tag information;
wherein the tag information is associated information of the metadata extracted in association with the content, and the service control unit extracts the metadata using a partial meta-invocation control method, and
wherein the service control unit comprises:
a metadata management unit configured to extract the metadata of the content, and to designate the tag information based on the metadata; and
a community management unit configured to analyze an interest of a user of the terminal using the tag information designated in association with the content via the metadata management unit, and to support generation of a community with another user who has an interest similar to that of the user of the terminal.

2. The service apparatus of claim 1, wherein the service control unit performs control so that whether a content identical to the content has been stored is checked in response to the request, and manages to enable the content to be shared between terminals if the content identical to the content has been stored, and a community service between the terminals in which the shared content has been stored is supported.

3. The service apparatus of claim 1, wherein the service control unit first extracts metadata, which has been greatly changed, using at least one metadata invocation method in which the service apparatus considers a usage history and a data distribution processing situation.

4. The service apparatus of claim 1, wherein the metadata comprises one or more of: any one of information about a time at which the content was first created, information about an author who created the content, source information, information about an absolute path, an object size and an object type folder of the content, an audio codec, a video codec, format information, a resolution, a sample rate and a file format related to playback of the content; any one of recent access time information, usage frequency information and recent modification time information before the upload of the content, recent access time information, usage frequency information and recent modification time information after the upload of the content, recent access time information and recent modification time information after the upload of the content, and pieces of information about a genre, a title, a player and a singer of the content designated by the user of the terminal; and pieces of information about gender, an age group, hobbies and a place of a residence related to personal information of the user of the terminal.

5. The service apparatus of claim 1, wherein the community management unit searches for another user, who has an interest similar to that of the user of the terminal, among users designated as agreeing with the generation of the community, and supports the generation of the community between the user of the terminal and the other user.

6. The service apparatus of claim 5, wherein the community management unit sends a message intended for the generation of the community to the user of the terminal and the other user.

7. A data management method based on cloud computing, comprising:
receiving, by a service apparatus comprising a processor, a request for an upload of a specific content from at least one terminal;
classifying and extracting, by the service apparatus, metadata of the content on a per-terminal basis using a partial meta-invocation control method in response to the request;
designating, by the service apparatus, tag information associated with the extracted metadata;
analyzing, by the service apparatus, an interest of a user of the terminal using the tag information designated in association with the content;
supporting, by the service apparatus, generation of a community with another user who has an interest similar to that of the user of the terminal; and
performing, by the service apparatus, data interoperability between different terminals using the tag information;
wherein the tag information is associated information of the metadata extracted in association with the content.

8. The data management method of claim 7, further comprising:
checking, by the service apparatus, whether a content identical to the content has been stored in response to the request;
performing, by the service apparatus, management so that the content is shared between terminals if the content identical to the content has been stored; and
supporting, by the service apparatus, a community between terminals in which the shared content has been stored.

9. The data management method of claim 8, wherein checking the attribute information and the user information comprises:
combining, by the service apparatus, information about at least one of a file format, a playback time, resolution, a compression method, an encoding type, a file name, a file size, and picture quality in order to check the attributes of the content; and
checking whether the content identical to the content has been stored by performing comparison.

10. The data management method of claim 8, wherein performing the management comprises providing, by the service apparatus, terminal information and user information of another terminal in which the content has been stored.

11. The data management method of claim 8, further comprising:
extracting, by the service apparatus, attribute information included in the content and metadata associated with usage information of the content if the content identical to the content has not been stored;

classifying and managing, by the service apparatus, the extracted metadata on a per-terminal basis; and storing, by the service apparatus, executable data of the content.

12. The data management method of claim 8, wherein supporting the community comprises providing, by the service apparatus, at least one community of a social network service (SNS) and an instant messenger (IM) between the terminals in which the identical content has been stored.

13. The data management method of claim 7, wherein classifying and extracting the metadata on the per-terminal basis comprises first extracting metadata, which has been greatly changed, using at least one metadata invocation method in which the service apparatus considers a usage history and a data distribution processing situation.

14. The data management method of claim 7, further comprising receiving, by the service apparatus, terminal information from the terminal.

15. The data management method of claim 14, wherein classifying and extracting the metadata on the per-terminal basis comprises:

checking, by the service apparatus, attribute information of the content that is included in the content and user information of the content; and extracting the metadata using the attribute information, the user information, and the terminal information.

\* \* \* \* \*